United States Patent
Bareis

(10) Patent No.: US 8,059,801 B2
(45) Date of Patent: Nov. 15, 2011

(54) TELEPHONE COMMUNICATIONS SYSTEM, A METHOD OF DELIVERING CONTENT TO A CALLING PARTY AND A METHOD OF DISTRIBUTING INFORMATION TO A CALLING PARTY

(75) Inventor: Bernard F. Bareis, Plano, TX (US)

(73) Assignee: Preferred Voice, Inc., Dallas, TX (US)

( * ) Notice: Subject to any disclaimer, the term of this patent is extended or adjusted under 35 U.S.C. 154(b) by 1241 days.

(21) Appl. No.: 11/625,756

(22) Filed: Jan. 22, 2007

(65) Prior Publication Data

US 2007/0189497 A1 Aug. 16, 2007

Related U.S. Application Data

(60) Provisional application No. 60/760,973, filed on Jan. 20, 2006.

(51) Int. Cl.
*H04M 15/00* (2006.01)
(52) U.S. Cl. .......... 379/114.13; 379/201.01; 379/207.02
(58) Field of Classification Search ............. 379/211.01, 379/67.1, 70, 88.22, 88.23, 88.25
See application file for complete search history.

(56) References Cited

U.S. PATENT DOCUMENTS

| | | | |
|---|---|---|---|
| 4,811,382 A | 3/1989 | Sleevi | |
| 5,321,740 A | 6/1994 | Gregorek et al. | |
| 6,385,308 B1 | 5/2002 | Cohen et al. | |
| 6,980,793 B2 | 12/2005 | Lee | |
| 7,006,608 B2 | 2/2006 | Seelig et al. | |
| 7,010,112 B2 | 3/2006 | Lee et al. | |
| 7,072,644 B2 | 7/2006 | Ahn et al. | |
| 7,171,200 B2 | 1/2007 | No et al. | |
| 7,184,529 B1* | 2/2007 | Taylor et al. ............. | 379/114.13 |
| 7,184,532 B2 | 2/2007 | Creamer et al. | |
| 7,227,929 B2 | 6/2007 | Seelig et al. | |
| 2004/0120493 A1 | 6/2004 | Creamer et al. | |
| 2004/0174983 A1 | 9/2004 | Olschwang et al. | |
| 2005/0096006 A1* | 5/2005 | Chen et al. ................... | 455/400 |
| 2005/0105706 A1 | 5/2005 | Kokkinen | |
| 2005/0117726 A1 | 6/2005 | DeMent et al. | |
| 2005/0207555 A1 | 9/2005 | Lee et al. | |
| 2005/0243989 A1 | 11/2005 | Lee et al. | |
| 2006/0285675 A1* | 12/2006 | Radziewicz et al. ..... | 379/215.01 |
| 2006/0291639 A1* | 12/2006 | Radziewicz et al. ..... | 379/211.01 |
| 2010/0278324 A1* | 11/2010 | Radziewicz et al. ..... | 379/207.16 |

FOREIGN PATENT DOCUMENTS

| | | |
|---|---|---|
| EP | 1081928 A2 | 3/2001 |
| EP | 1081928 A2 | 3/2001 |
| EP | 1558011 A2 | 7/2005 |
| EP | 15580101 A2 | 7/2005 |
| GB | 2404522 A | 2/2005 |
| GB | 2404522 A | 2/2005 |
| KR | 20020071488 A | 9/2002 |
| KR | 20020097044 A | 12/2002 |
| KR | 20020097076 A | 12/2002 |
| WO | WO2004032460 A2 | 4/2004 |

(Continued)

*Primary Examiner* — Creighton Smith

(57) ABSTRACT

A telephone communications system, a method of delivering content to a calling party and a method of distributing information to a calling party. In one embodiment, the telephone communications system includes: (1) a master subsystem configured to store ringback information including content and application rules for the ringback information and (2) a trunk interface subsystem coupled to the master subsystem and configured to perform call processing and apply at least a portion of the ringback information to at least one call-in-progress according to the application rules.

24 Claims, 10 Drawing Sheets

FOREIGN PATENT DOCUMENTS

| | | | |
|---|---|---|---|
| WO | 2005/099387 | A2 | 10/2005 |
| WO | 2005/099387 | A2 | 10/2005 |
| WO | 2005/104574 | A1 | 11/2005 |
| WO | 2005/104574 | A1 | 11/2005 |
| WO | 2005/112492 | A1 | 11/2005 |
| WO | 2005/112492 | A1 | 11/2005 |
| WO | 2005/122542 | A1 | 12/2005 |
| WO | 2005/122542 | A1 | 12/2005 |

* cited by examiner

TELEPHONE COMMUNICATIONS SYSTEM, A METHOD OF DELIVERING CONTENT TO A CALLING PARTY AND A METHOD OF DISTRIBUTING INFORMATION TO A CALLING PARTY

CROSS REFERENCE TO RELATED APPLICATION

This application claims the benefit of U.S. Provisional Application No. 60/760,973 entitled "TELEPHONE COMMUNICATIONS SYSTEM AND METHOD FOR ENABLING ADVERTISING, SPECIALIZED CONTENT, AND PERSONALIZED MESSAGING" by Bernard F. Bareis, filed on Jan. 20, 2006, which is incorporated herein by reference in its entirety.

TECHNICAL FIELD OF THE INVENTION

The present invention is directed, in general, to telecommunication systems and, more specifically, to a system providing presentation of specialized audio and/or other content to calling parties in lieu of, in addition to, or during, A ringback, also referred to as ringback tone, or telephone channel audible ringing.

BACKGROUND OF THE INVENTION

The telecommunications industry presently offers a wide variety of telephony services to customers via telecommunications networks, providing wired or wireless access. In a fundamental role, the telecommunications networks interconnect one or more calling telephones to one or more called telephones. In implementing such interconnections, a calling telephone places a call via a communications channel through one or more central office or mobile telephone exchange switches. As used herein, "telephone" may refer to a station, wireless telephone, cellular or mobile telephone, PCS telephone, satellite telephone, wireline telephone, analog telephone, digital telephone, VoIP telephone, WiFi telephone communications device, or the like.

In the past, telecommunications networks employed a standardized ringback tone audible ring generation circuit within central office or mobile telephone exchange switches to apply an audible ringing signal to a communications channel to be heard by a calling party following dialing of digits and prior to answer by the distant end called party or an automated answering device. Such audible ringing was applied to the communications channel by the switching system at the end of the intended link connected via wireline or wireless methodologies from the telephone of the calling party to the telephone of the called party.

In more recent years, advances in intelligent peripheral systems for central office and mobile telephone exchange switches have enabled limited replacement of standardized ringback tone with other audio on telephone calls between an individual as a calling party and an individual as a called party using the called party's single wireless telephone line.

Conventional ringback tone replacement systems lack the functionality to rapidly replace a standardized ringback tone on entire trunk groups assigned to corporations that are directed at call centers. Present day systems for ringback audio replacement are further limited in that back-end components for interconnecting to the telephone network are always separate from front-end Internet accessible user interface components and billing system interface components. Such separate components are typically each supplied by different vendors with many unique interfaces.

A multitude of components from various vendors creates numerous difficulties in building and deploying a complete system. It is also a drawback of present day standardized ringback tone replacement systems that such systems are not designed with modularity in mind such that a set of modules can be economically configured for a small carrier and additional modules can be added and/or mixed and matched to provide economical centralized, regionalized, or distributed solutions for larger carriers.

Conventional ringback tone replacement systems also lack an architecture whereby multiple carriers can be serviced by one system. Additionally, present day systems for ringback audio replacement have limited features that are available. For example, providing ringback audio associated with the physical location of a mobile telephone customer is not possible in present day systems.

Accordingly, what is needed in the art is a telephone communications system with improved ringback capabilities and a method of providing the improved ringback capabilities to calling parties.

SUMMARY OF THE INVENTION

To address the above-discussed deficiencies of the prior art, the invention provides a telephone communications system, a method of delivering content to a calling party and a method of distributing information to a calling party.

In one embodiment, the invention provides a telephone communications system including: (1) a master subsystem configured to store ringback information including content and application rules for the ringback information and (2) a trunk interface subsystem coupled to the master subsystem and configured to perform call processing and apply at least a portion of the ringback information to at least one call-in-progress according to the application rules.

In another aspect, the present invention provides a method of delivering content to a calling party. In one embodiment, the method includes: (1) receiving an incoming telephone call on a trunk line from a calling party, (2) retrieving application rules associated with the trunk line and (3) applying content, based on the application rules, to a calling path established with the calling party.

In yet another aspect, the present invention provides a method of distributing information to a calling party. In one embodiment, the method includes: (1) delivering ringback content to a calling party while a call is in-progress, (2) receiving input from the calling party based on the ringback content and (3) distributing information to the calling party based on the input.

The foregoing has outlined, rather broadly, preferred and alternative features of the present invention so that those skilled in the art may better understand the detailed description of the invention that follows. Further elaborations as well as additional features of the invention will be presented hereinafter. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The invention is best understood from the following Detailed Description when read with the accompanying FIGUREs. Reference is now made to the following descriptions taken in conjunction with the accompanying drawings, in which.

DETAILED DESCRIPTION

The invention provides a telephone communications system and method for implementing ringback improvements, including: audio replacement, generation, presentation, augmentation, and/or modification with an ability to handle at least one corporate trunk group as well as a telephone communications system and method for enabling enhanced feature sets.

The enhanced feature sets may include, but not limited to, ringback audio or other content applied based on: a physical location of a telephone, cell site in use by a telephone, location of a telephone based on a Location Based Service (LBS) technology, location of a telephone as determined by information stored in a database, location of a telephone based on Internet Protocol address, location of a telephone based on radio wave propagation direction triangulation, location of a telephone based on global positioning system (GPS) technology, time of day, day of week, date, an event, a calendar period, calling party identification (Caller I.D.), NPA, NXX, dialed number, a rule set, a random selection of content, a previously chosen group of selected content (such as might be considered a "juke box" list or a "play list"), combinations of the aforementioned criteria, or the like.

Further, the invention provides a telephone communications system with configurable modular components and an end-to-end solution from billing and provisioning to storefront ordering and real-time call processing is needed. In addition, a telephone communications system providing ringback generation, replacement, modification, and/or augmentation having an ability to operate in conjunction with more than one telephone carrier at a time is needed.

Figure 1:
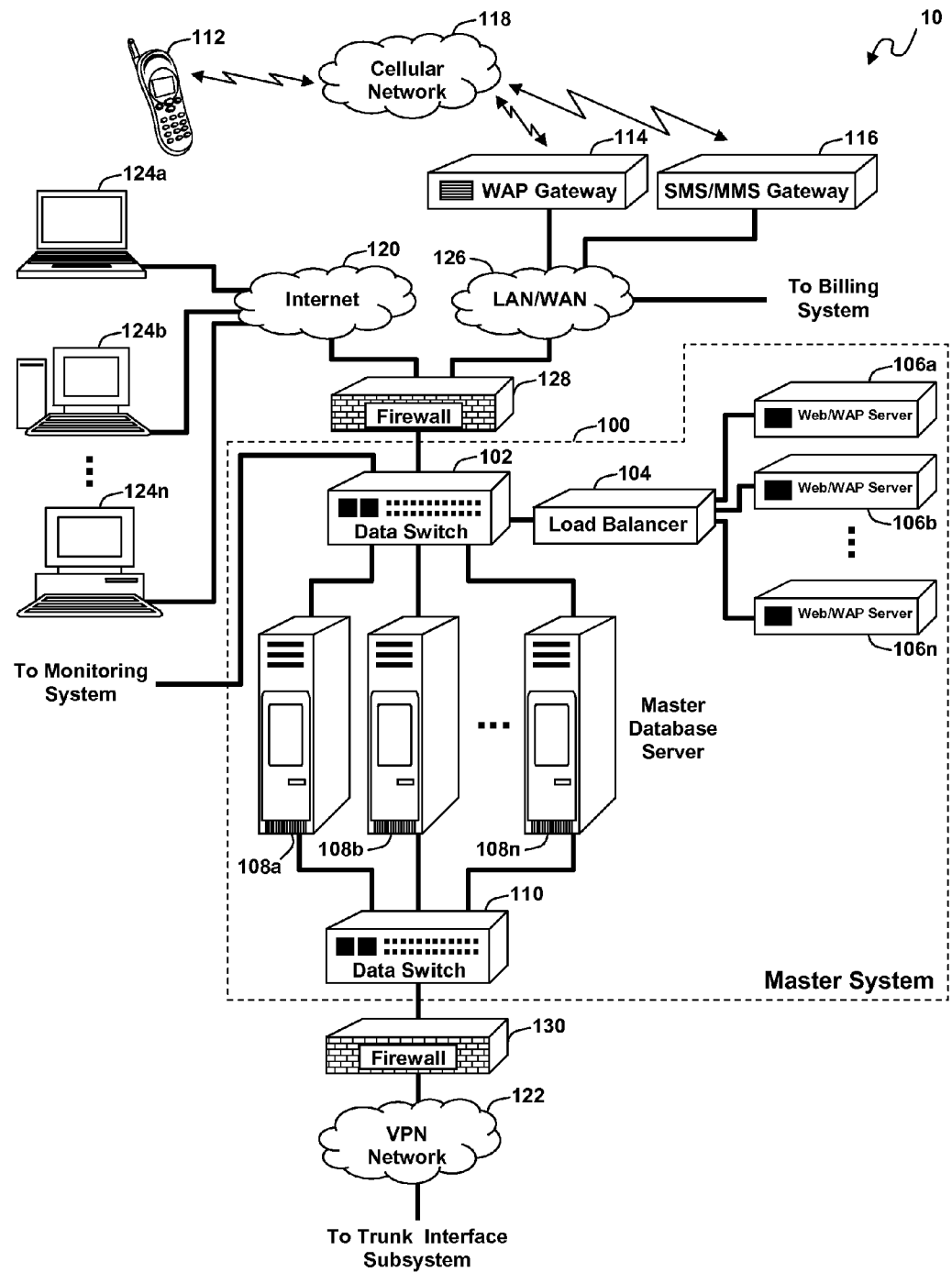
FIG. 1 illustrates a system level diagram of an embodiment of a Master System component of the present invention operating in an environment for application of the principles of the present invention.
Figure 2:
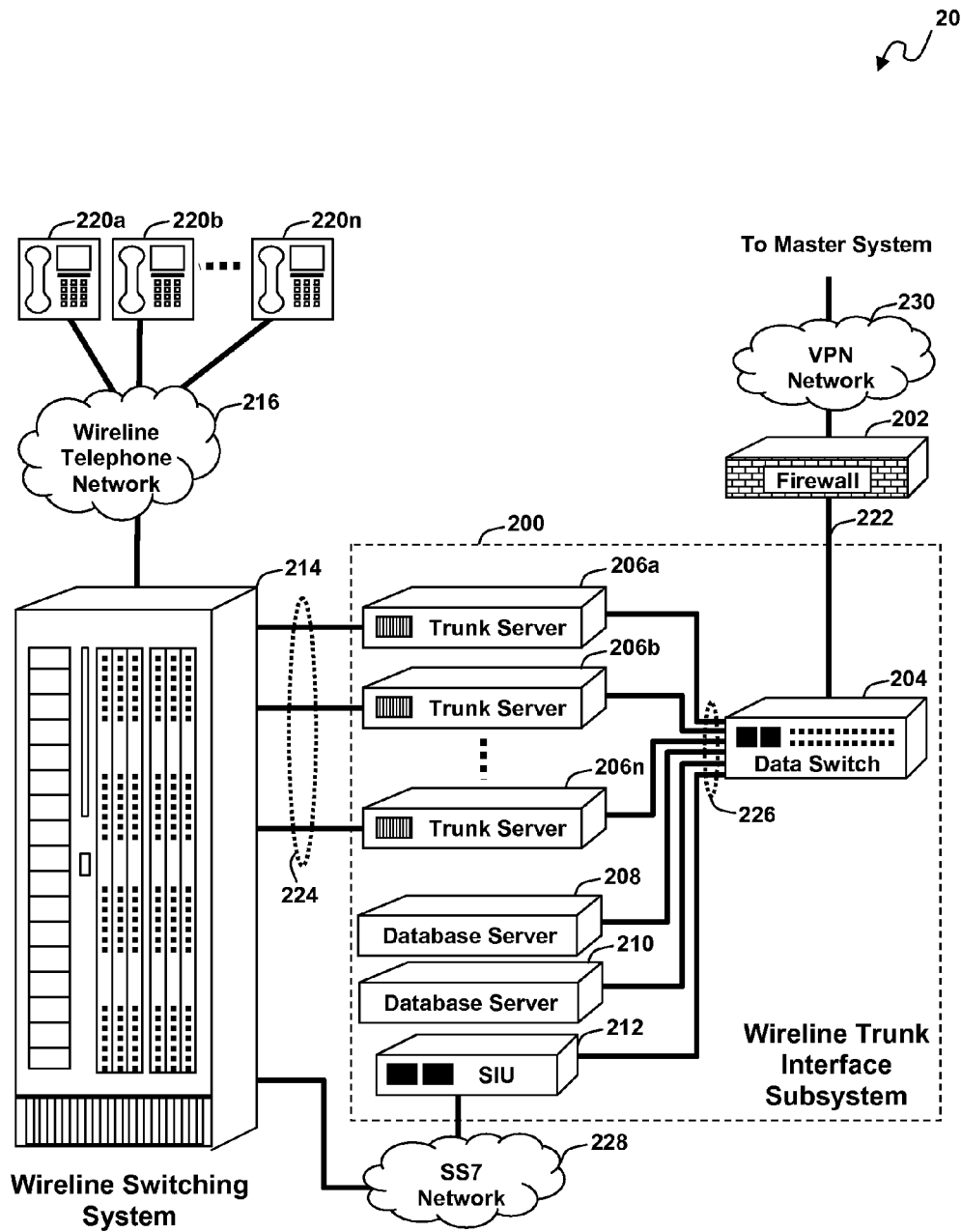
FIG. 2 illustrates a system level diagram of an embodiment of a Trunk Interface Subsystem of the present invention operating in a wireline network environment and constructed according to the principles of the present invention.
Figure 3:
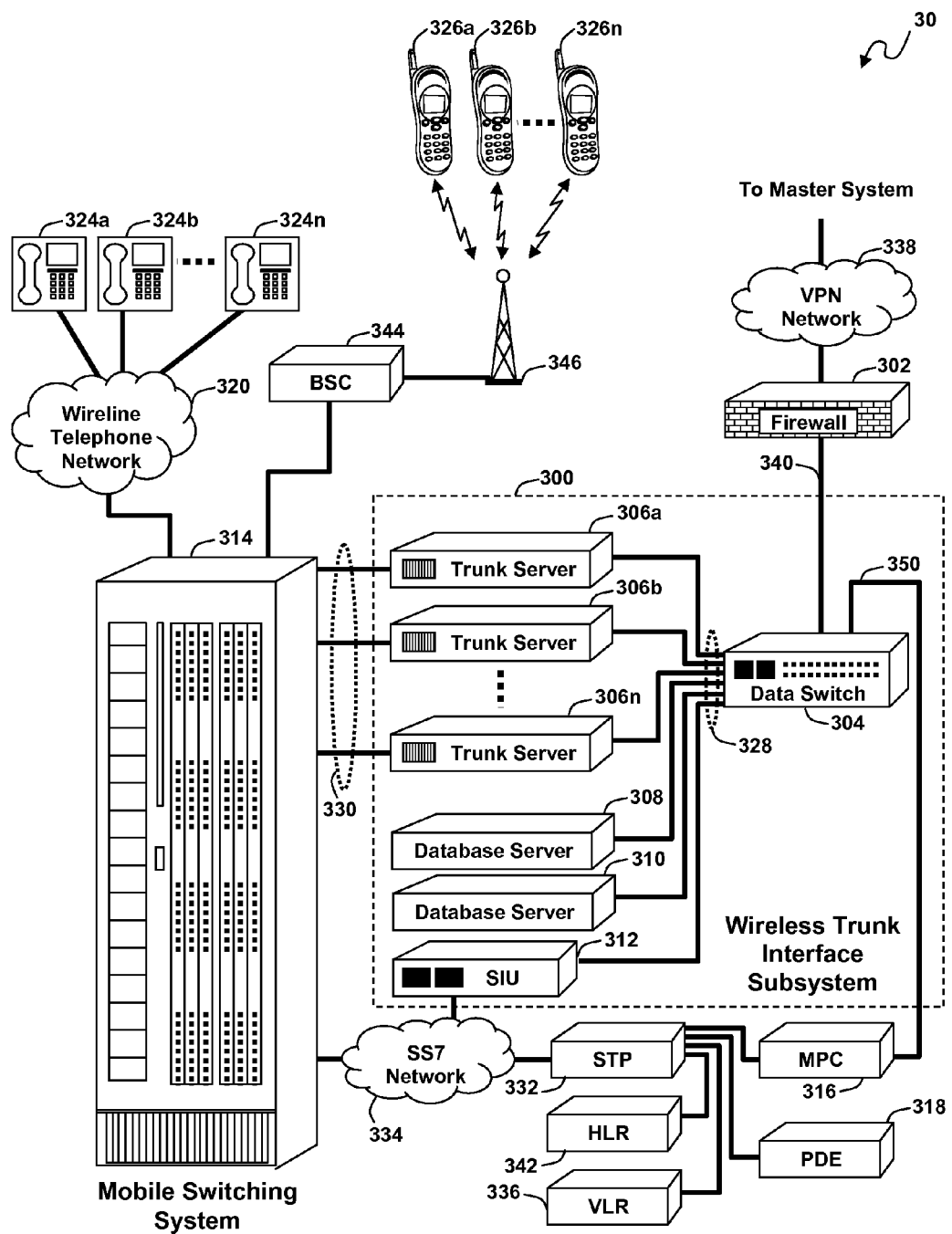
FIG. 3 illustrates a system level diagram of an embodiment of a Trunk Interface Subsystem of the present invention operating in a wireless network environment and constructed according to the principles of the present invention.

Referring initially simultaneously to FIGS. 1, 2, and 3, the invention is embodied as an intelligent peripheral system including a Master System component as shown, for example, in FIG. 1 as Master System 100 and at least one associated Trunk Interface Subsystem component as shown, for example, as Trunk Interface Subsystem 200 in a wireline switching environment 20 in FIG. 2 or as Trunk Interface Subsystem 300 in a wireless switching environment 30 in FIG. 3. While one embodiment of the present invention contemplates a set of components for a Master System and a Trunk Interface Subsystem, it should be understood that each component can be modularly separated or combined to provide useful functionality. For example, the Master System component as depicted in FIG. 1, could be set up to control a number of Trunk Interface Subsystems 200 of FIG. 2 and/or 300 of FIG. 3 across multiple wireline and/or wireless carrier service providers. The Trunk Interface Subsystem 200 of FIG. 2 and 300 of FIG. 3 can handle call processing and application of ringback audio or other content. It should be further understood that said components can be separate from a switching system such as being components of an intelligent peripheral system or alternatively may be embedded within a switching system.

A wireline network environment as shown, for example, as 20 of FIG. 2 is provided to show an application of the invention in a conventional wired telephone network environment; however, wireline network environment is intended to apply to any of a number of network configurations whereby communication between the network switching system components and the telephone of the called party is through a wired connection. Examples of wired network connections include, but are not limited to wired public switched telephone network (PSTN) connections, wired global switched telephone network (GSTN) connections, wired voice over Internet protocol (VoIP) telephone connections, wired voice over network (VON) connections, wired digital packet-based voice connections, wired cable network connections, wired public telephone connections, wired pay telephone connections, wired analog voice connections, and the like.

A wireless network environment as shown, for example, as 30 of FIG. 3 is provided to show an application of the invention in a mobile or cellular telephone network environment; however, wireless network environment is intended to apply to any of a number of network configurations whereby communication between the network switching system components and the telephone of the called party is through a non-wireline connection. Examples of wireless network connections include, but are not limited to non-wireline public switched telephone network (PSTN) telephone connections, PCS network connections, wireless and WiFi voice over Internet protocol (VoIP) telephone connections, cellular or mobile telephone connections, satellite telephone connections, radio telephone connections, radio network connections, cordless telephone connections, wireless and WiFi voice over network (VON) connections, wireless digital packet-based voice connections, wireless public telephone connections, wireless analog voice connections, and the like.

Referring now to FIG. 1, illustrated is a system level diagram of an embodiment of a Master System 100 component of the present invention operating in an environment 10 for application of the principles of the present invention. Environment 10 may be a location or a site of a wireless or wireline carrier or similar service provider. Environment 10 may alternatively be a location or a site of a party that is not a wireless or wireline carrier or similar service provider, said party may include, but not be limited to, a party such as a seller or distributor of music, video, animations, advertising, entertainment, application services, or the like.

According to one embodiment of the invention as shown in FIG. 1, the telephone communications system includes a Master System 100. The function of the Master System 100 is to provide a means for service subscribers and/or those who manage the service account to access the telephone communications system to make changes to or otherwise modify account parameters or features, to provide a means for storing, modifying, and/or updating audio or other content selections that can be applied, to provide a means for charging and/or billing, to provide a means for monitoring of system operation, provide a means for generating system alerts, and to provide a means to manage the overall operation of the ringback related service being supplied. Monitoring systems for intercommunication with the telephone communications system of the present invention may implement SNMP (Simple Network Monitoring Protocol), TL-1, proprietary protocols, or other protocols or data formats.

In order for a subscriber or someone managing an account to access the telephone communications system to make account changes, for example, such persons could make use of one or more personal computer systems 124a-124n and communicate with the telephone communications system via the Internet 120. The communications would be further processed securely through firewall 128 and with Master System 100.

Yet other means for a subscriber or someone managing an account to access the telephone communications system are also possible. For example, an interactive voice response (IVR) interface, a WAP interface applying a WAP gateway 114, or an SMS/MMS interface applying a SMS/MMS gateway 116 could be used. Both the WAP gateway 114 and the SMS/MMS gateway 116 employ a wireless means for communicating via the cellular network 118 and the wireless telephone 112 of the called party.

Reasons for a subscriber or someone managing an account to access the telephone communications system include, but are not limited to subscriber provisioning, applying a rule base to determine when and/or how audio selections are to be presented, generating or modifying audio or other content to be used for ringback purposes, augmenting audio to be used for ringback purposes, billing inquiries, customer support communications, notices, system monitoring, loading content, removing content, and/or purchasing content. Content, such as that which may be applied by the present invention in lieu of or in conjunction with standard ringback tone over at least one communications path, can include, but is not limited to music, sounds, sound effects, noises, advertisements, SMS messages, MMS messages, multimedia messages, text messages, Instant Messages (IM), audio selections, voice selections, tones, video selections, video clips, video streams, audio streams, animations, combinations thereof, or the like. Ringback information may include content (ringback content) and a ringback tone or tones.

An access to the Master System 100 by a subscriber or someone managing an account using a wireless telephone 112 employing a wireless applications protocol (WAP) user interface would be accommodated through cellular network 118, a WAP gateway 114, a data network such as a local area network (LAN) and/or wide area network (WAN) represented by LAN/WAN network 126, and a firewall 128.

A similar access to the Master System 100 by a subscriber or someone managing an account using a wireless telephone 112 employing a short messaging system (SMS) or a multimedia messaging system (MMS) user interface would be accommodated through cellular network 118, a SMS/MMS gateway 116, a data network such as a local area network (LAN) and/or wide area network (WAN) represented by LAN/WAN network 126, and a firewall 128.

Referring to FIG. 1, the Master System 100 is comprised of a data switch 102, a load balancer 104, at least one Web/WAP server 106a-106n, at least one master database server 108a-108n, and a data switch 110. Within Master System 100, the at least one master database server 108a-108n provides functions which may include, but are not limited to, storage of content, storage of user or subscriber account information, storage of call records, storage of system logs, storage of billing and/or purchasing records, storage of rule sets for applying content, storage of backup and/or mirrored files associated with trunk interface subsystems, storage of transitory files, storage of network configuration information, and the like. Further, when configured for high reliability and redundant operation and where more than one master database server 108a-108n is employed such as in a cluster, storage of like information between master database servers 108a-108n is accommodated to ensure that data within the database is not lost should a one of the master database servers 108a-108n fail. Web and WAP user interface functionality is accommodated within at least one Web/WAP server 106a-106n. Given the potential that in sizeable carriers a large number of service subscribers may need access to the system within a short period of time, more than one Web/WAP server 106a-106n may be employed and a load balancer 104 may be used to more evenly distribute the accesses by these subscribers. The Master System 100 is modular in design and can support various sizes of carriers or service providers and their respective customer bases and/or subscribers. Web/WAP servers 106a-106n and master database servers 108a-108n can be added as needed to support larger carriers or larger service provider requirements. In small carrier or service provider networks the load balancer 104 may not be a device as shown in FIG. 1, but may alternatively be functionality incorporated in software within Web/WAP servers 106a-106n or, in some cases, may not be used at all. Load balancers, such as load balancer 104, typically serve to efficiently distribute data services among multiple computer application servers. A data switch 102 is employed to facilitate data communications such as by Ethernet connections between the load balancer 104 and/or Web/WAP servers 106a-106n, master database servers 108a-108n, firewall 128, and a monitoring system.

The Master System 100 further serves to supply information to or receive information from at least one Trunk Interface Subsystem. Such information may include, but is not limited to, rules for applying content for ringback purposes, call detail records, call statistics, alarm notifications, content updates, database updates, database queries, file transfers, data transfers, calling party input, or the like. Information to or from at least one Trunk Interface Subsystem is accommodated between at least one master database server 108a-108n interconnected with data switch 110 of Master System 100 and interconnected through firewall 130 and typically through a VPN network 122. The aforementioned rules for applying content for ringback purposes may include, but are not limited to, applying content using time-of-day, day-of-week, holiday, date, year, other time-based parameters, physical location of a wireless phone, physical location of a wireline phone, based on at least one NPA, based on at least one NXX, based on other geographic calling area parameters, based on at least one trunk group, based on at least one dialed number, based on mobile identification number (MIN), based on electronic serial number (ESN), based on at least one IP address, based on at least one called party identifier, based on at least one calling party identifier, or based on any other identifying characteristics.

For business applications, such as in corporations or other business environments where advertising and/or consumer relations are important factors, the Master System 100 is capable of receiving input from corporate customers administrating accounts to enable application or generation of specialized ringback audio or other content on the corporation's respective trunk groups or other telephone lines typically utilized by consumers calling the corporation. Such a capability enables corporations to present informational messages, corporate jingles, recognizable audio, specialized content, entertaining content, and/or advertisements to consumers in place of or in addition to a standardized ringback tone. A novel capability of the telephone communications system is that it enables specialized audio for ringback purposes to be applied to a specific set or subset of telecommunications trunks or lines and for those calls being received on said telecommunications trunks or lines to be directed to a respective set or subset of telecommunications trunks or lines. Conventional systems for supplying ringback audio in place of standardized ringback tones do not have this capability and are limited to the application of ringback audio on calls each on single telecommunications lines directed to a single telephone set based on a single telephone number.

The ability to input, select, modify, and/or apply specialized audio or other content in place of or in conjunction with a ringback tone to a group of telecommunications lines or trunks is one aspect of the present invention. Such a capability is required, for example, for receiving calls on at least one trunk group associated with a "1-800" or similar number, a "1-900" or similar number, a number representing a "hunt group," a toll trunk group connection, DID lines, VoIP trunk(s), or the like of a corporation, applying specialized ringback audio to these calls, and then directing said calls to a call center of the corporation on an associated at least one trunk group. Calls may, for example, be directed to multiple telephone sets receiving multiple calls represented by a single telephone number. Further, calls associated with a corporation, but directed to different telephone numbers of the corporation, may have at least one specialized ringback tone or other content applied to all incoming calls of the corporation.

The invention also provides the capability of enabling multiple sources for supplying content. Additionally, the operation of the present invention is typically such that not until a change in service, provisioning update, content update, file transfer, or other feature is required that both Master System and Trunk Interface Subsystem components are directed to work in conjunction with one another. This aspect of the present invention enables modular configuration and separation or other capabilities. For example, in another embodiment, the Master System 100 can be configured without an integrated localized at least one Web/WAP server 106a-106n and/or load balancer 104. The at least one Web/WAP server 106a-106n and load balancer 104 could be located at another site and could even be managed by a party that sells or distributes music or other content. In yet another embodiment and as an alternative, Master System 100 can be configured with an integrated localized at least one Web/WAP server 106a-106n and/or load balancer 104 and could additionally be operational in conjunction with additional non-localized Web/WAP servers. A novel aspect of the present invention is that it enables content for application as a ringback tone or other audio or content to be managed locally or remotely or in combinations thereof and by one or more parties. A further novel aspect of the present invention is its capability of having one or more Internet storefronts for Web and/or WAP based user access. A multiple storefront capability is necessary when the system is configured to economically operate with multiple carriers, for example. Each carrier requires their own respective branding, trademarks, and logos. Further, each carrier may have differing ringback content selections and differing pricing for items that can be purchased.

Referring now to FIG. 2, illustrated is a system level diagram of an embodiment of a Trunk Interface Subsystem 200 of the present invention operating in a wireline network environment 20. The Trunk Interface Subsystem 200 serves as an intelligent peripheral subsystem providing a means to apply audio or other content for ringback purposes to telephone calls being processed through a wireline switching system 214.

The Trunk Interface Subsystem 200 is comprised of at least one trunk server 206a-206n, a database server 208, an optional redundant database server 210, a SS7 signaling interface unit (SIU) 212, and a data switch 204. Data interconnection cables 226 provide, for example, 10/100/1000 BaseT Ethernet communications with operability up to gigabit per second data rates for interconnection between components of the Trunk Interface Subsystem 200.

For purposes of illustration, a communications session whereby ringback audio is applied to a call occurs when at least one incoming call is received from at least one calling party utilizing a corresponding telephone such as at least one of a portion of 220a-220n and said at least one incoming call being routed to at least one trunk server 206a-206n for ringback application. A call is routed to the at least one trunk server 206a-206n based on one or more criteria from a list that may include, but is not limited to dialed number, trunk group, NPA, called party, or the like. The incoming call initiated by a calling party proceeds from at least one telephone of a portion of a plurality of telephones 220a-220n through wireline telephone network 216, through wireline switching system 214, through at least one communications line or trunk 224, and to at least one trunk server 206a-206n. Upon receiving the incoming call, the at least one trunk server 206a-206n applies content to the in-progress call according to a rule set and initiates a call leg to the party being called. In one embodiment of the present invention, the outgoing call leg may be sent out from the wireline switching system 214 directly and through wireline telephone network 216 initiated using SS7 signaling from SIU 212 through SS7 network 228 to wireline switching system 214 and said SIU 212 controlled by the at least one trunk server 206a-206n via data switch 204 and data interconnection cables 226. In another embodiment, the outgoing call leg may be sent out from the at least one trunk server 206a-206n through at least one communications line or trunk 224 that may be typically, for example, T1 in North America, E1 in Europe, or J1 in parts of Asia to wireline switching system 214 and then on through wireline telephone network 216. Said outgoing call leg would be under control of the at least one trunk server 206a-206n utilizing SS7 signaling generated by SIU 212 being controlled by the at least one trunk server 206a-206n via data interconnection cables 226 and data switch 204. In yet another embodiment, the at least one communications line or trunk 224 may be ISDN PRI. In an embodiment utilizing ISDN PRI, SIU 212 would not be implemented and signaling would occur via at least one ISDN D-channel associated with at least one ISDN PRI making up the at least one communications line or trunk 224.

While the call is progressing and is connected to or under control of the at least one trunk server 206a-206n, a content selection is presented according to a rule set to at least one calling party. Said content selection, for example, being audio in the form of a corporate jingle and being presented over all telephone lines associated with the corporation. In cases where the incoming call is progressing through a plurality of switching systems such as over a long distance telephone network path or through an interexchange network, a method is applied whereby the content selection is assured to be presented to the calling party as intended by the content developer and/or system administrator, or the like. In call paths involving a plurality of switching systems, it is not uncommon for the voice path of the call to not be fully completed for a period of time at the beginning of a call. In most cases when standardized ringback tone is applied, this anomaly goes unnoticed by the calling party since silence, typically only silence, is heard until the ringback tone begins. In the case where a recognizable piece of music is played, for example, a missing portion of the beginning of the music piece would be noticed. It is therefore important to ensure sufficient time for the voice path to be fully made. This can be accomplished for example, by applying a timing delay, a prepended short "silence" or other audio clip, through synchronization of signaling, through synchronization of audio path completion, through accurate and well timed signaling, a combination of the aforementioned means, or the like.

Once initiated, the outgoing call leg progresses through wireline telephone network 216 and towards a calling party using at least one of a portion of the plurality of telephones 220a-220n. Once the outgoing call leg is in progress, the at least one trunk server 206a-206n determines when the outgoing call towards the called party is answered. The call may be answered, for example, by the called party, by an answering machine of the called party, by an automated answering system such as a voice mail system, by a messaging system, by a network special information tone (SIT) application device, by at least one operator, by at least one agent, by at least one representative, by at least one person, by combinations thereof, or the like. Upon answer of the call, the outgoing call leg is connected to the incoming call leg. In the preferred embodiment of the present invention, the wireline trunk interface subsystem 200 is removed from the call once the incoming call leg and the outgoing call leg are connected. This functionality can be achieved using interconnection technologies such as release-link on trunks such as T1, E1, or J1 trunks or using two B-channel transfers on ISDN PRI trunks, for example. In another embodiment, the incoming call leg and the outgoing call leg could be connected through the at least one trunk server 206a-206n and the at least one trunk server 206a-206n could remain in the each call for the duration of each call.

It should be understood that various embodiments of the wireline trunk interface subsystem 200 can be realized such that incoming calls to as well as any outgoing calls from the at least one trunk server 206a-206n may be over at least one communications line or trunk 224 of a type from a group consisting at least one of T1, E1, J1, ISDN PRI, T3, E3, J2, Internet Protocol (IP) link, analog trunk, optical link (such as SONET, SDH, or optical Ethernet), or the like. In the case where an Internet Protocol (IP) link is used, voice communications and signaling would typically progress over this link and further would typically be applied by the at least one trunk server 206a-206n communicating using IP Multimedia Subsystem (IMS) based standards and protocols, VoIP based standards and protocols, VON based standards and protocols, or the like. It should be further understood that the present invention is versatile in its ability to integrate into various network environments. For example, in some network environments T1, E1, or J1 trunk compatible switching systems may be utilized in conjunction with trunk interface conversion equipment for integrating with VoIP network environments and that in such instances, a trunk interface subsystem 200 could be integrated into either the conventional T1 or E1 network environment portion or the VoIP network environment portion.

Referring to the trunk interface subsystem 200 of FIG. 2, content is stored on the database servers 208 and 210 for use by the at least one trunk server 206a-206n to apply to at least one in-progress call. Content is stored into at least one of database server 208 or database server 210 from other components of the intelligent peripheral system such as Master System 100 of FIG. 1 by way of VPN network 230, firewall 202 and data interconnection cable 222. Master System 100 of FIG. 1 would typically contain a superset of the content stored in at least one of the database servers 208 and/or 210 of FIG. 2. In some embodiments, the database servers 208 and/or 210 of FIG. 2 may only include content which is required and may be segregated from that content contained in other similar trunk interface subsystems by carrier, by geographic area, or by purchased or selected content, for example.

High reliability is a concern in telephone networks and the present invention enables highly reliable operation including redundant subsystem components as well as enabling an ability to utilize the routing capabilities of the wireline switching system 214 to route around failed intelligent peripheral call processing components such as trunk interface subsystem 200. Redundant components of trunk interface subsystem 200 may include, but are not limited to an "nth" trunk server such as trunk server 206n in a "n+1" redundancy configuration whereby an additional trunk server is implemented to act in place of a failed trunk server. Optional database server 210 is a redundant database server and is configured to act in place of database server 208 should database server 208 fail. Further SIU 212 may be of a type capable of redundant operation and automated switching over of its operation to redundant components.

The modularity of the overall construction of the present invention is important for enabling cost-effective deployment in large and small carriers alike. In one embodiment, system cost may be reduced in small carrier environments while maintaining reliability by not implementing redundant components and by enabling specialized application of the routing capabilities within wireline switching system 214 to bypass trunk interface subsystem 200 in the event of failure. In this embodiment, when the trunk interface subsystem is being routed around, calls progress through the wireline switching system 214 and the wireline telephone network 216 and make use of the standardized ringback tone within a switching system such as wireline switching system 214 or a similar switch within wireline telephone network 216. The present invention enables calls to be routed around it upon failure and employs features of wireline switching system 214 to accomplish this.

Referring now to FIG. 3, illustrated is a system level diagram of an embodiment of a Trunk Interface Subsystem 300 of the present invention operating in a wireless network environment and more specifically in a cellular or mobile network environment 30. The Trunk Interface Subsystem 300 serves as a intelligent peripheral subsystem providing a means to apply audio or other content for ringback purposes to telephone calls being processed through a mobile switching system 314.

The Trunk Interface Subsystem 300 is comprised of at least one trunk server 306a-306n, a database server 308, an optional redundant database server 310, a SS7 signaling interface unit (SIU) 312, and a data switch 204. Data interconnection cables 328 provide, for example, 10/100/1000 BaseT Ethernet communications with operability up to gigabit per second data rates for interconnection between components of the Trunk Interface Subsystem 300.

For purposes of illustration, a communications session whereby ringback audio is applied to a call occurs when at least one incoming call is received from at least one calling party utilizing a corresponding telephone such as at least one of a portion of wireline telephones 324a-324n or such as at least a portion of wireless telephones 326a-326n and said at least one incoming call being routed to at least one trunk server 306a-306n for ringback application. A call is routed to the at least one trunk server 306a-306n based on one or more criteria from a list that may include, but is not limited to home location register (HLR) tag, HLR table, HLR entry, HLR identifier, HLR communications, VLR tag, VLR table, VLR entry, VLR identifier, CAMEL, WIN triggers, database query, Local Number Portability (LNP) database, dialed number, trunk group, NPA, NXX, a company name, called party, or the like. In one embodiment, a incoming call initiated by a calling party proceeds from at least one telephone of a portion of a plurality of wireline telephones 324a-324n through wireline telephone network 320 and through to mobile switching system 314. Mobile switching system 314 then queries HLR 324 to determine if specialized ringback is to be applied to the call by trunk interface subsystem 300. In the case where it is determined that specialized ringback is to be applied to the call in conjunction with or in lieu of standardized ringback tone as indicated by a predetermined rule set stored and/or applied within at least one trunk server 306a-306n, the incoming call is routed through at least one communications line or trunk 330 and to at least one trunk server 306a-306n. Upon receiving the incoming call, the at least one trunk server 306a-306n applies content to the in-progress call according to a rule set and initiates a call leg to the party being called. In one embodiment of the present invention, the outgoing call leg may be sent out from the mobile switching system 314 directly and through base station controller (BSC) 344 and wireless network 346, for example. The outgoing call leg may be initiated using SS7 signaling from SIU 312 through SS7 network 334 to mobile switching system 314 and said SIU 312 controlled by the at least one trunk server 306a-306n via data switch 304 and data interconnection cables 328. In another embodiment, the outgoing call leg may be sent out from the at least one trunk server 306a-306n through at least one communications line or trunk 330 that may be typically, for example, T1 in North America, E1 in Europe, or J1 in parts of Asia to mobile switching system 314 and then on through BSC 344 and wireless network 346. Said outgoing call leg would be under control of the at least one trunk server 306a-306n utilizing SS7 signaling generated by SIU 312 being controlled by the at least one trunk server 306a-306n via data interconnection cables 328 and data switch 304. In yet another embodiment, the at least one communications line or trunk 330 may be ISDN PRI. In an embodiment utilizing ISDN PRI, SIU 312 would not be implemented and signaling would occur via at least one ISDN D-channel associated with at least one ISDN PRI making up the at least one communications line or trunk 330.

While the call is progressing and is connected to or under control of the at least one trunk server 306a-306n, a content selection is presented according to a rule set to at least one calling party. Said content selection, for example, being audio in the form of an advertisement. In cases where the incoming call is progressing through a plurality of switching systems such as over a long distance telephone network path, a method is applied whereby the content selection is assured to be presented to the calling party as intended by the content developer and/or system administrator, or the like.

Once initiated, the outgoing call leg progresses through BSC 344 and wireless network 346 and towards a calling party using at least one of a portion of the plurality of mobile telephones 326a-326n. Once the outgoing call leg is in progress, the at least one trunk server 306a-306n determines when the outgoing call towards the called party is answered. The call may be answered, for example, by the called party, by an answering machine of the called party, by an automated answering system such as a voice mail system, by a network special information tone (SIT) application device, or the like. Upon answer of the call, the outgoing call leg is connected to the incoming call leg. In the preferred embodiment of the present invention, the wireless trunk interface subsystem 300 is removed from the call once the incoming call leg and the outgoing call leg are connected. This functionality can be achieved using release-link trunking on T1, E1, or J1 trunks or using two B-channel transfers on ISDN PRI trunks. In another embodiment, the incoming call leg and the outgoing call leg could be connected through the at least one trunk server 306a-306n and the at least one trunk server 306a-306n could remain in the each call for the duration of each call.

It should be understood that various embodiments of the wireless trunk interface subsystem 300 can be realized such that incoming calls to as well as any outgoing calls from the at least one trunk server 206a-206n may be over at least one communications line or trunk 224 of a type from a group consisting at least one of T1, E1, J1, ISDN PRI, T3, E3, J2, Internet Protocol (IP) link, analog trunk, optical link (such as SONET, SDH, or optical Ethernet), or the like. In the case where an Internet Protocol (IP) link is used, voice communications and signaling would typically progress over this link and further would typically be applied by the at least one trunk server 306a-306n communicating using IP Multimedia Subsystem (IMS) based standards and protocols or the like.

Referring to the trunk interface subsystem 300 of FIG. 3, content is stored on the database servers 308 and 310 for use by the at least one trunk server 306a-306n to apply to at least one in-progress call. Content is stored into at least one of database server 308 or database server 310 from other components of the intelligent peripheral system such as Master System 100 of FIG. 1 by way of VPN network 338, firewall 302 and data interconnection cable 340. Master System 100 of FIG. 1 would typically contain a superset of the content stored in at least one of the database servers 308 and/or 310 of FIG. 3. In some embodiments, the database servers 308 and/or 310 of FIG. 3 may only include content which is required and may be segregated from that content contained in other similar trunk interface subsystems by carrier, by geographic area, or by purchased or selected content, for example. The database servers of 308 and/or 310 may alternatively contain a complete set of content as is contained in Master System 100 of FIG. 1 depending upon application requirements.

In yet another embodiment, Positioning Determination Entity (PDE) 318 is employed to enable location based service (LBS) capabilities to be combined or used in conjunction with specialized ringback. PDE 318 provides physical location information of a mobile telephone such as at least one of mobile telephone 326a-326n to at least one trunk server 306a-306n through signal transfer point (STP) 332 on through mobile positioning center (MPC) 316, through data interconnection cable 350, through data switch 304, and on to the at least one trunk server 306a-306n via data interconnection cable(s) 328. Such a capability enables an innovative and valuable deployment of specialized advertising over wireless network facilities. For example, a mobile phone user may make a call to a "1-800" service nearing lunch time. As a means to offset the cost of a "1-800" number, the company having the "1-800" number may elect to have advertisements from yet other corporations applied as ringback audio to offset the cost of the "1-800" number. One such location based advertisement could be applied for a local restaurant chain with a location near the current physical geographic location of the calling party. Such an advertisement could convey, for example, that a particular meal is available for a limited period through lunch time on that day and could also give brief directions to or location information of the restaurant. In cases where the location information is accurate enough such as that obtained through a global positioning system (GPS), an advertising ringback announcement could simply inform the calling party that the restaurant is currently to their "left," for example. Such a ringback announcement may optionally delay the call to the called party in order to provide complete location or other information for the calling party. During the advertisement, a caller could also enter information such as through DTMF digits, using a specialized tone generating device, or by voice using a voice recognition system component employing a echo cancellation or telecommunications hybrid equivalent algorithm and "barge-in" capability to recognize speech or the presence of speech over outgoing ringback audio as a part of the present invention. Such input information or response from the calling party could then be used for purposes which may include, but not be limited to, providing the calling party a coupon, sending a text message, sending an e-mail message, sending an instant message (IM), sending a multimedia message (MMS), sending a short message service (SMS) message, sending a video presentation (streaming media, video clip, etc.), sending an advertisement, sending a coupon or other information via postal service or other delivery service, storage for later use, combinations thereof, or the like.

In a cellular or mobile network environment 30, call routing to the trunk interface subsystem 300 is commonly accomplished using a home location register (HLR) 342 and/or a visitor location register (VLR) 336. HLR 342 and VLR 336 are components of mobile networks that are employed to determine the appropriate portion of the mobile network to utilize for enabling communications with at least one of the plurality of mobile telephones 324a-324n and may be additionally employed in conjunction with the present invention to ensure, for example, that a call to the telephone number of a mobile telephone is routed to at least one trunk server 306a-306n upon a first use of the telephone number during said call through mobile switching system 314 and that a outgoing call leg for specialized ringback content application purposes on the same telephone number is properly routed to said mobile telephone as opposed to being improperly routed back to the at least one trunk server 306a-306n. The determination of how to route a call to within a mobile network is sometimes referred to using the terminology "location request" via an HLR such as HLR 342 and should be distinguished from the determination of a physical geographic location or position of a mobile telephone such as determined using a PDE 318.

High reliability is a concern in wireless networks and the present invention enables highly reliable operation including redundant subsystem components as well as enabling an ability to utilize the routing capabilities of the mobile switching system 314 to route around failed intelligent peripheral call processing components such as trunk interface subsystem 300. Redundant components of trunk interface subsystem 300 may include, but are not limited to an "nth" trunk server such as trunk server 306n in a "n+1" redundancy configuration whereby an additional trunk server is implemented to act in place of a failed trunk server. Optional database server 310 is an optional redundant database server and when used is configured to act in place of database server 308 should database server 308 fail. Further SIU 312 may be of a type capable of redundant operation and automated switching over of its operation to redundant components.

The modularity and scalability of the overall construction of the present invention is important for enabling cost-effective deployment in large and small carriers alike. In one embodiment, system cost may be reduced in small carrier environments while maintaining reliability by not implementing redundant components and by enabling specialized application of the routing capabilities within mobile switching system 314 to bypass trunk interface subsystem 300 in the event of failure. In this embodiment, when the trunk interface subsystem is being routed around, calls progress through the mobile switching system 314 and the BSC 344 and wireless network 346 and make use of the standardized ringback tone within a switching system such as mobile switching system 314. The present invention enables calls to be routed around it upon failure and employs features of mobile switching system 314 to accomplish this.

Figure 4:
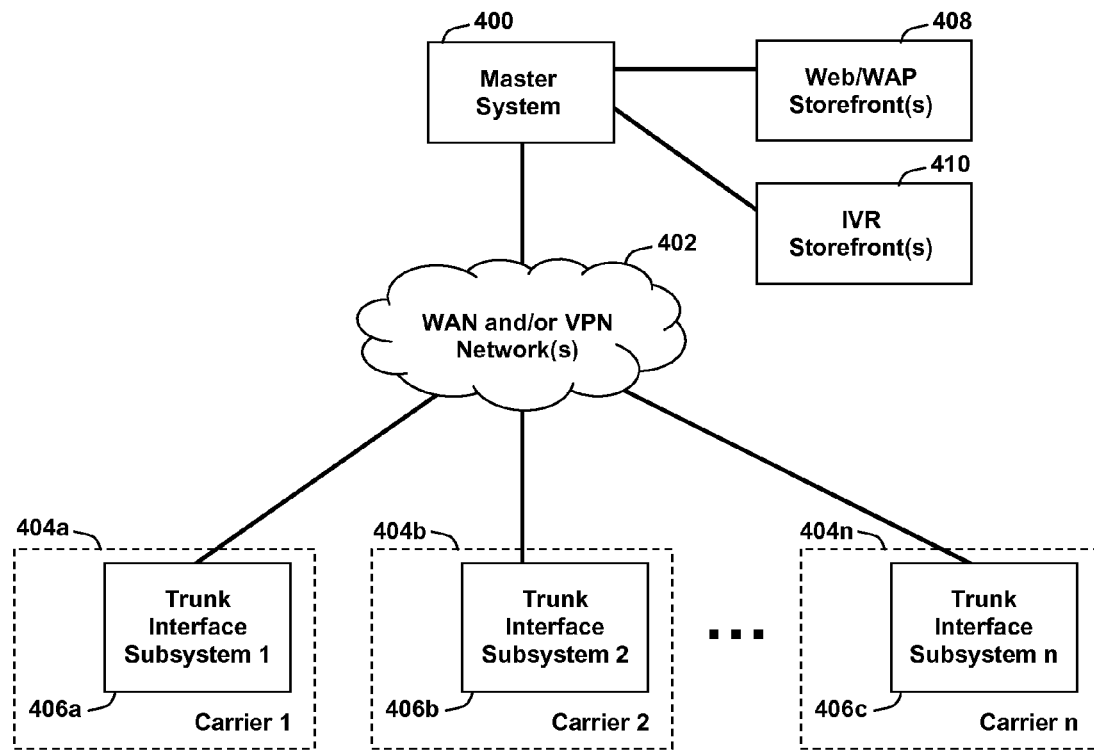
FIG. 4 illustrates a system level diagram of an embodiment of the present invention constructed according to the principles of the present invention in a multivendor and/or multiple carrier environment.

Referring now to FIG. 4, illustrated is a detailed system level diagram of the present invention in a multivendor and/or multiple carrier embodiment. In some instances, it is advantageous to deploy a telephone communications system as an intelligent peripheral having a singular or centralized Master System 400 that can interoperate with trunk interface subsystems 406a-406n operating within a plurality of carrier networks 404a-404n. A plurality of carrier networks 404a-404n may include for example, but not be limited to, regionalized carrier affiliates, international carrier affiliates, partnering carriers, unrelated carriers operating in conjunction with a revenue sharing service provider, and the like.

Intercommunications between Master System 400 and trunk interface subsystems 406a-406n may occur through at least one WAN and/or VPN Network 402. In typical applications separate carriers prefer securely separated data networks and in such cases, point-to-point data networks and/or VPN networks over the Internet may be implemented.

Referring again to FIG. 4, in a telephone communications system of the present invention having, for example, trunk interface subsystems at multiple carriers, it is additionally important to be able to offer to the customers of said carriers what appear to be independent and respective Web, WAP, and/or IVR storefronts for purchase, uploading, updating, and/or other control of content. To support this type of operation, Master System 400 may employ internally or separately a plurality of Web/WAP storefronts 408 and/or a plurality of interactive voice response (IVR) storefronts 410.

In another embodiment of the present invention, Master System 400 may be located within the facilities of a service offering corporation enabling carriers that provide "1-800" services, "1-900" services, and the like to offer their corporate customers the ability to apply advertisements, corporate jingles, specialized messages, marketing information, and the like in lieu of standardized ringback tone transmitted to calling parties on incoming calls. Trunk interface subsystems 404a-404n would be located typically within the respective networks 404a-404n of carriers providing said "1-800" services, "1-900" services, and the like. Updates for respective corporate customers to content for application to telephone calls during the ringback application period would be transferred between Master System 400 and trunk interface subsystems 404a-404n via at least one WAN and/or VPN network 402. In this embodiment, typical updates to content would be accomplished through a Web user interface and may possibly be performed using a Web/WAP storefront 409 or IVR storefront 410.

Figure 5:
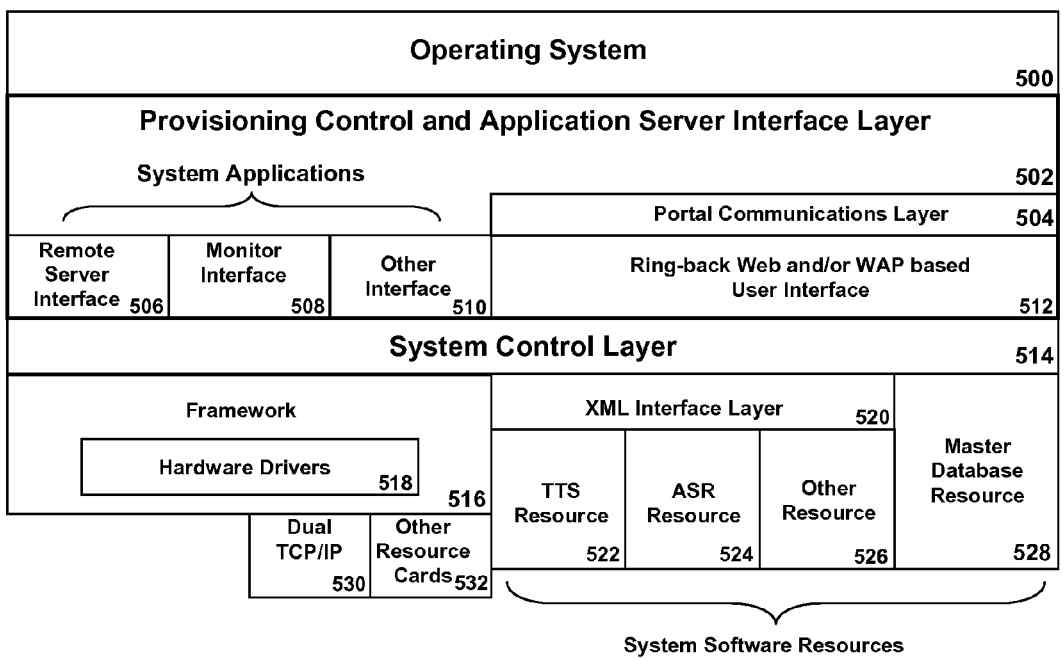
FIG. 5 illustrates a diagram of software components of the embodiment of Master System 100 of FIG. 1 constructed according to the principles of the present invention.

Referring now to FIG. 5, illustrated is a diagram of an embodiment of Master System 100 of FIG. 1. Master System 100 may be embodied as a sequence of operating instructions, hardware or a combination thereof. At the highest level is operating system 500, which in the preferred embodiment is a Microsoft Corporation Windows™ series operating system such as Windows Server 2003™. Alternatively, in another embodiment an operating system such as Sun Microsystems Corporation Solaris™ operating system could be used. Operating under the operating system 500 is the provisioning control and application server interface layer 502 that is comprised of systems applications such as remote server interface 506, monitor interface 508, and other interface 510 as well as a portal communications layer 504 and ringback Web and/or WAP based user interface(s) 512. Remote server interface 506 is employed to communicate information from system applications such as the ringback storefront or administrative user interface to or from remote billing or provisioning servers for the purpose of transaction billing and enabling or disabling the specialized ringback service respectively. Data information, such as billing, purchasing, or provisioning data, between remote server interface 506 and remote servers is processed through system control layer 514 framework 516 incorporating hardware drivers 518 and through Dual TCP/IP 530 hardware which is typically a 10/100/1000 BaseT Ethernet card employed to communicate via a LAN or WAN network to and/or from remote servers. In addition, remoter server interface 506 serves as a means to enable communications between a Master System such as Master System 100 of FIG. 1 and trunk servers incorporated as components of wireline trunk interface subsystem 200 of FIG. 2 and/or wireless trunk interface subsystem 300 of FIG. 3.

In one embodiment, portal communications layer 504 is employed within provisioning and application server interface layer 502 under operating system 500 on a single computer server. Portal communications layer 504 is used to enable communications with ringback Web and/or WAP based user interface(s) 512. In another embodiment, the functions of said portal communications layer and/or ringback Web and/or WAP based user interface(s) 512 may be located within one computer server or may alternatively be deployed amongst, across, or within a plurality of computer servers. Ringback Web and/or WAP based user interface(s) 512 serve as a means to enable users to access content, apply rule sets to content, apply rule sets or operability constraints for calling party input during telephone calls, purchase content for use, administer user account features, view service notices, communicate with support representatives, view Web or WAP based advertisements within the user account, view billing information pertaining to the account, operate functionality such as described in the audio content file control routine of FIG. 8, place content into or ingest content into the Master System 100 of FIG. 1 and the like. Such Web and/or WAP based user interface(s) 512 are useful in single vendor implementations and are additionally useful in multivendor implementations. Resources such as ASR resource 524 can be used to serve as additional user input mechanisms, typically for Web and/or IVR based user interfaces.

Referring again to FIG. 5, system control layer 514 is employed to enable applications, typically within the systems application area or within ringback Web and/or WAP based user Interface(s) 512, to control resources within Master System 100 of FIG. 1 or to enable command, control, data, an/or informational communications such as with external resources, devices, or other computer servers. Software resources within Master System 100 of FIG. 1 may include, but are not limited to a text-to-speech (TTS) resource 522, an automatic speech recognition (ASR) resource 524, other resources 526 that may be installed permanently or on an "as needed" basis, and a master database resource 528. It should be understood that a database resource such as master database resource 528 may be comprised of at least one database amongst, across, or within at least one computer server. In an embodiment having at least one external master database resource operable amongst at least two computer servers, for example, communications conveying data may occur via system control layer 514 framework 516 in conjunction with hardware drivers 518 through an Internet protocol or Ethernet interface such as dual TCP/IP 530 interface or alternatively through other resource cards 532.

XML interface layer 520 serves as a means to enable a common interface between system applications and resources such as TTS resource 522, ASR resource 524, and/or other system resources 526. If required, database resource 528 may also use a common interface such as XML interface layer 520. The present invention makes use of a common interface layer such as an XML interface layer 520 so that third-party software resource components to be used as system software resources can be installed and/or removed easily and as such resources are required by applications. While an XML language is preferred for the interface layer, it should be understood that alternative solutions and/or interface layers may be equally viable for system operation.

Figure 6:
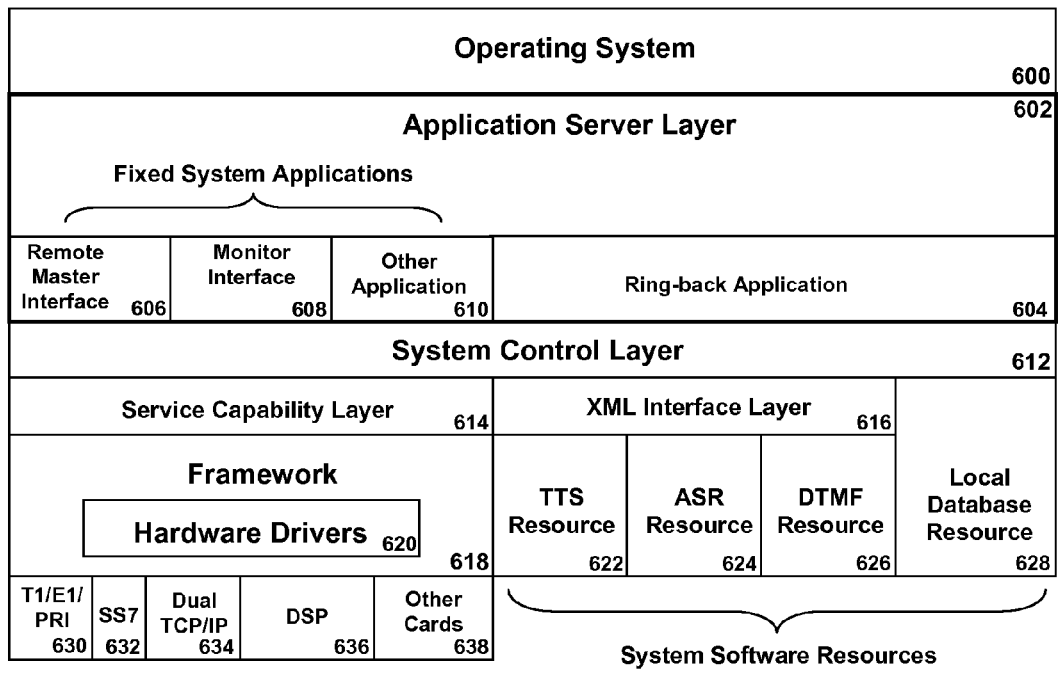
FIG. 6 illustrates a diagram of software components of an embodiment of the Trunk Server of FIGS. 2 and 3 constructed according to the principles of the present invention.

Referring now to FIG. 6, illustrated is a diagram of a Trunk Server of FIGS. 2 and 3. The Trunk Server 100 may be embodied as a sequence of operating instructions, hardware or a combination thereof. At the highest level is operating system 600, which in the preferred embodiment is a Microsoft Corporation Windows™ series operating system such as Windows Server 2003™. Alternatively, in another embodiment an operating system such as Sun Microsystems Corporation Solaris™ operating system could be used. Operating under the operating system 600 is the application server layer 602 which includes a ringback application 604 and additionally may include, but is not limited to, fixed system applications such as remote master interface 606, monitor interface 608, other application(s) 610, and the like. Remote master interface 606 serves as a means to communicate, typically via the system control layer 612, between the ringback application 604 and a Master System such as Master System 100 of FIG. 1 via service capability layer 614, framework 618 incorporating hardware drivers 620, and through a data communications interface such as dual TCP/IP 634. The Service capability layer 614 is employed as a means for enabling a common interface layer to a software framework 618 for hardware components or services within a trunk server such as the at least one trunk server 206a-206n of FIG. 2 and/or the at least one trunk server 306a-306n of FIG. 3. Service capability layer 614 may be a OSA model service capability layer, for example.

When processing calls for specialized ringback service, ringback application 604 is functioning and controls the flow, path, routing, and/or content transmission of calls using at least one interface such as SS7 632 and/or T1/E1/PRI 630. In addition to being capable of supplying signaling in some instances, T1/E1/PRI serves as a interface means to apply content to telephone calls. In an alternative embodiment where a trunk server is applied in a network environment where an aforementioned IMS, VoIP, or VON interface is required, a TCP/IP or Ethernet interface such as dual TCP/IP 634 would be used for signaling, call control, and/or applying content to the telephone call.

In various embodiments, system software resources are available to perform required functions as needed by the ringback application 604. For example, in one embodiment DTMF resource 626 and/or ASR resource 624 could be used to obtain input in the form of DTMF digits or speech, respectively, from a calling party while specialized ringback content is being applied to a call. Additionally, text messages may be converted to spoken messages using a TTS resource 622 while specialized ringback content is being applied to a call.

System control layer 612 further serves as a means for ringback application 604 to interoperate with XML layer 616 and associated resources such as TTS resource 622, ASR resource 624, DTMF resource 626, and the like. DTMF resource 626 is capable of receiving and/or transmitting DTMF digits. Local database resource 628 is utilized to locally store data needed within a trunk server and is of critical importance for real-time applications or transmissions of content during the ringback period of in-progress telephone calls. It should be understood that local database resource 628 could be located within a trunk server such as the at least one trunk server 206a-206n of FIG. 2 and/or the at least one trunk server 306a-306n of FIG. 3 or alternatively within, among, or across other computer servers such as database servers and/or redundant database servers 208 and 210 of FIG. 2 and/or 308 and 310 of FIG. 3 each respectively.

Ringback application 604 is enabled via system control layer 612, service capability layer 614, framework 618 in conjunction with hardware drivers 620, and through at least one of T1/E1/PRI 630 interface, SS7 632 interface, DSP 636 resource, and other cards 638 to interoperate with hardware and software components within the same physical computer as well as with hardware and software components in external computer servers and other devices. Such hardware and software components may include, but not be limited to, a means for determining the physical and/or geographic location of a telephone such as PDE 318 of FIG. 3, digital signal processing algorithms and/or software contained in DSP 636 resource, signaling equipment, telephone networks, data networks, and the like.

Figure 7:
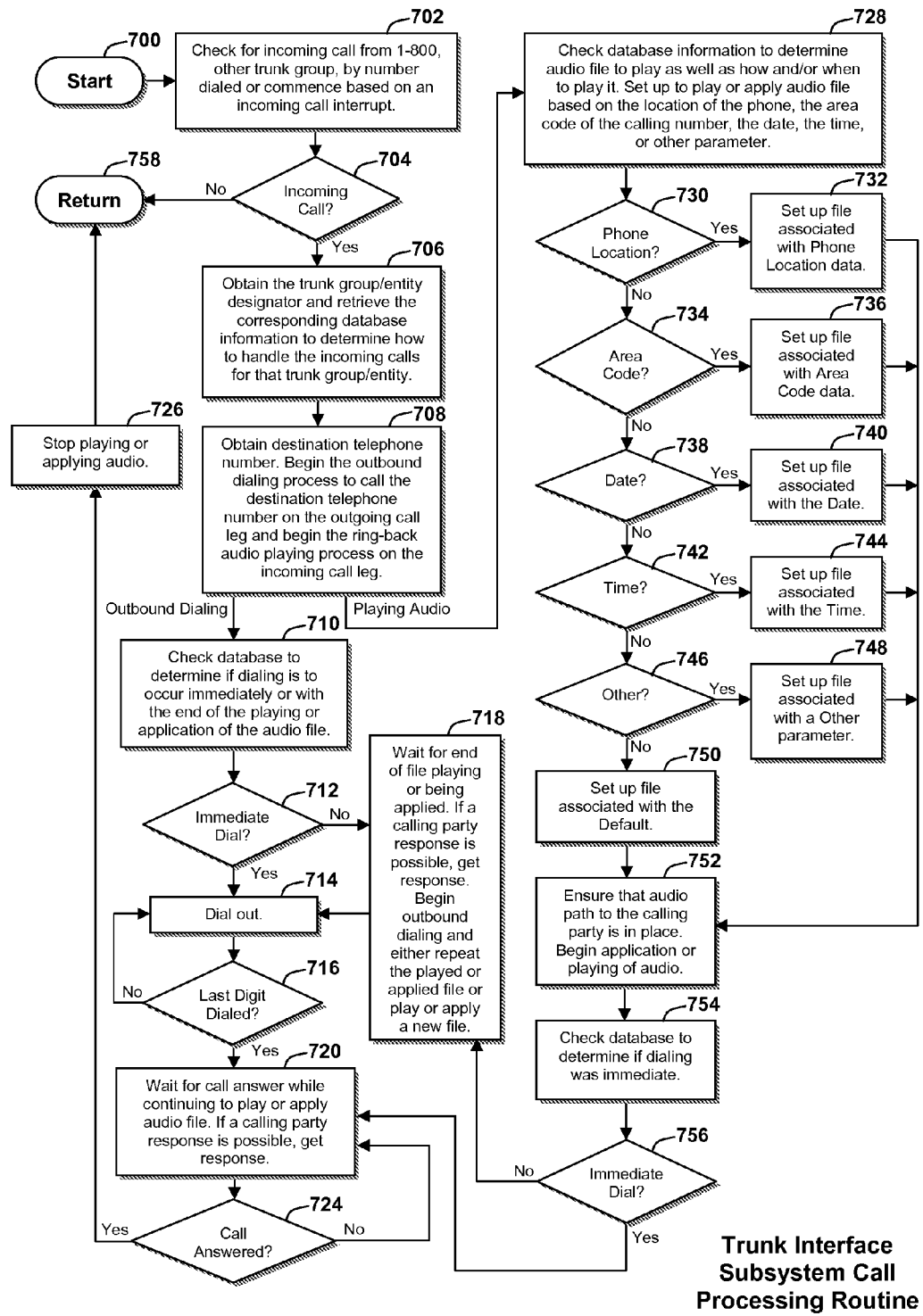
FIG. 7 illustrates a flowchart of an embodiment of a Trunk Server Call Processing routine carried out according to the principles of the present invention.

Referring now to FIG. 7, illustrated is a flowchart of a Trunk Server Call Processing routine. The software routine is entered in step 700 and processing follows through to step 702 where it is determined whether or not a call to have specialized ringback content applied is being received. A test is performed at step 704 and if an incoming call is present. If not, the routine ends in step 758 by returning and directing operation to other routines, applications, or processes. If a call is coming in at step 704, then in step 706 a trunk group/entity designator is obtained and corresponding database information is retrieved. A trunk group/entity designator is an identifier that provides a means for determining that calls on a group of trunks, telephone lines, or the like associated with a entity or corporation, for example, are to have applied respective specialized ringback content. Such an identifier, or alternatively a call routing means, may be accomplished through the implementation of at least one means which depending on the network type and application may include, but not be limited to, HLR tags, HLR triggers, HLR communications, HLR tables, VLR tags, VLR triggers, VLR communications, VLR tables, Local Number Portability (LNP) triggers, Local Number Portability (LNP) tables, switching system table entries, routing tables, database information, database queries, WIN triggers, AIN triggers, software algorithms, CAMEL, specialized switching system software, Internet Protocol, IP Multimedia Subsystem (IMS) protocols, and/or the like. Next in step 708, a destination telephone number for the call is obtained. The outbound dialing of the destination telephone number on an outgoing call leg and application of ringback content to the call such as by playing a ringback audio selection begin within a reasonably short period of time from one another so that the call progresses with few, or preferably no, unnecessary delays.

The routine continues down a path for playing audio to step 728 where a test where determines are made as to what content to present and when such as, for example, an audio file to play. Step 728 is concerned with factors in determining how and/or when to apply various pieces of content to each call. Such factors are elements of a series of tests and are represented using at least one rule set within a database and may include, but are not limited to the physical or geographic location of a telephone, a calling area within which the telephone is used such as might be determined using NPA and/or NXX designations, a date on which content is to be applied, a time at which content is to be applied, a period of time, caller identification information, at least one telephone number, called party identity, or based on any other identifier(s). In step 730, the physical and/or geographic location of a telephone is determined, if required by the ringback application. If the phone location is not required in the rule set, then progression continues to step 734; otherwise, progression is to step 732 where at least one content file associated with telephone location data is readied for application to or presentation on the call. Continuing with step 734, a test is provided to determine if content is to be applied to the call based on an area code such as that of the telephone number of the calling party. If the area code is not required in the rule set, then progression continues to step 738; otherwise, progression is to step 736 where at least one content file associated with area code data is readied for application to or presentation on the call. Continuing with step 738, a test is provided to determine if content is to be applied to the call based on a date such as on a holiday or possibly on a birth date or anniversary date of the calling party. If the date is not required in the rule set, then progression continues to step 742; otherwise, progression is to step 740 where at least one content file associated with at least one date is readied for application to or presentation on the call. Continuing with step 742, a test is provided to determine if content is to be applied to the call based on a time such as after office hours, if the called party is a corporation. If the time is not required in the rule set, then progression continues to step 746; otherwise, progression is to step 744 where at least one content file associated with time is readied for application to or presentation on the call. Continuing with step 746, a test is provided to determine if content is to be applied to the call based on yet another factor. If another factor is not required in the rule set, then progression continues to step 750; otherwise, progression is to step 748 where at least one content file associated with the other factor is readied for application to or presentation on the call. It should be understood that a plurality of rules may be applied and the routine can be constructed to test for additional factors, if needed. Continuing with step 750 a default content file is readied for application to or presentation on the call.

The routine progresses to step 752 from any of steps 732, 736, 740, 744, 748, or 750 as determined by prior test steps. Step 752 serves to ensure that the content is applied to the call properly as envisioned and/or expected such as by the creator of the content, the system administrator, or the like. In telecommunications networks, especially with respect to calls being placed through a plurality of switching systems over a long distance, it is possible, for example, for an audio path between a calling party and a trunk server supplying audio as a specialized ringback presentation to not be engaged synchronously with the beginning of the playing of said audio such that the calling party may not hear some portion of the beginning of the audio. The present invention; therefore, provides a means to ensure that the complete content, such as an audio presentation, is transmitted to a calling party as intended. In step 724, a determination is required to ensure that those pieces of content needing to be presented fully to a calling party can be while other presentations of content may alternatively be discontinued following the answering of the in-progress call. A test is made in step 756 to direct the progress of the routine to step 720 if the content can be discontinued immediately upon answering of the in-progress call such as by determining whether or not immediate dialing of digits for the outgoing call leg is needed in the outbound dialing path of the routine. If dialing is to be immediate, then the content is of a type that can be discontinued immediately upon answering of the call. Otherwise, the routine proceeds to step 718. In step 718, application of the content to the call continues, until the selection has been fully presented. During the period while content is being presented to the calling party, it is possible for the calling party to respond to said content being presented. For example, the content may be an audio advertisement that includes a question to the calling party or informs the calling party that by pressing a digit on the telephone a coupon will be sent to the calling party. At the completion of the presentation of content to the calling party in step 718, outbound dialing is prepared for and the routine progresses to step 714.

Referring to step 710 of FIG. 7, the outbound dialing path commences. In step 710, a database is queried to determine if dialing is to occur immediately or with the completion of the presentation of the content, such as might be applied from an audio file. In step 712 a test is performed to determine if immediate outbound dialing is required. If immediate outbound dialing is not required, then the routine proceeds to step 718. Otherwise, the routine proceeds to step 714. Outbound digit dialing occurs in steps 714 and 716, until the finial digit of the called party is dialed and the routine proceeds to step 720. It should be understood that digit dialing or an equivalent functionality may be accomplished via any of a plurality of means such as using a DTMF generator, a MF generator, using digital signaling, analog signaling, using optical signaling data paths, Internet protocol signaling, and the like.

In step 720, the routine waits for the call to be answered while application of content to the call continues. Step 724 is a test to determine whether or not the call has been answered. If the call has not yet been answered, the routine continues to step 720. Otherwise, the call is answered and the routine progresses to step 726 where the presentation, application, or transmission of the content is stopped. Following step 726, the routine ends at step 758 by returning and directing operation to other routines, applications, or processes.

Figure 8:
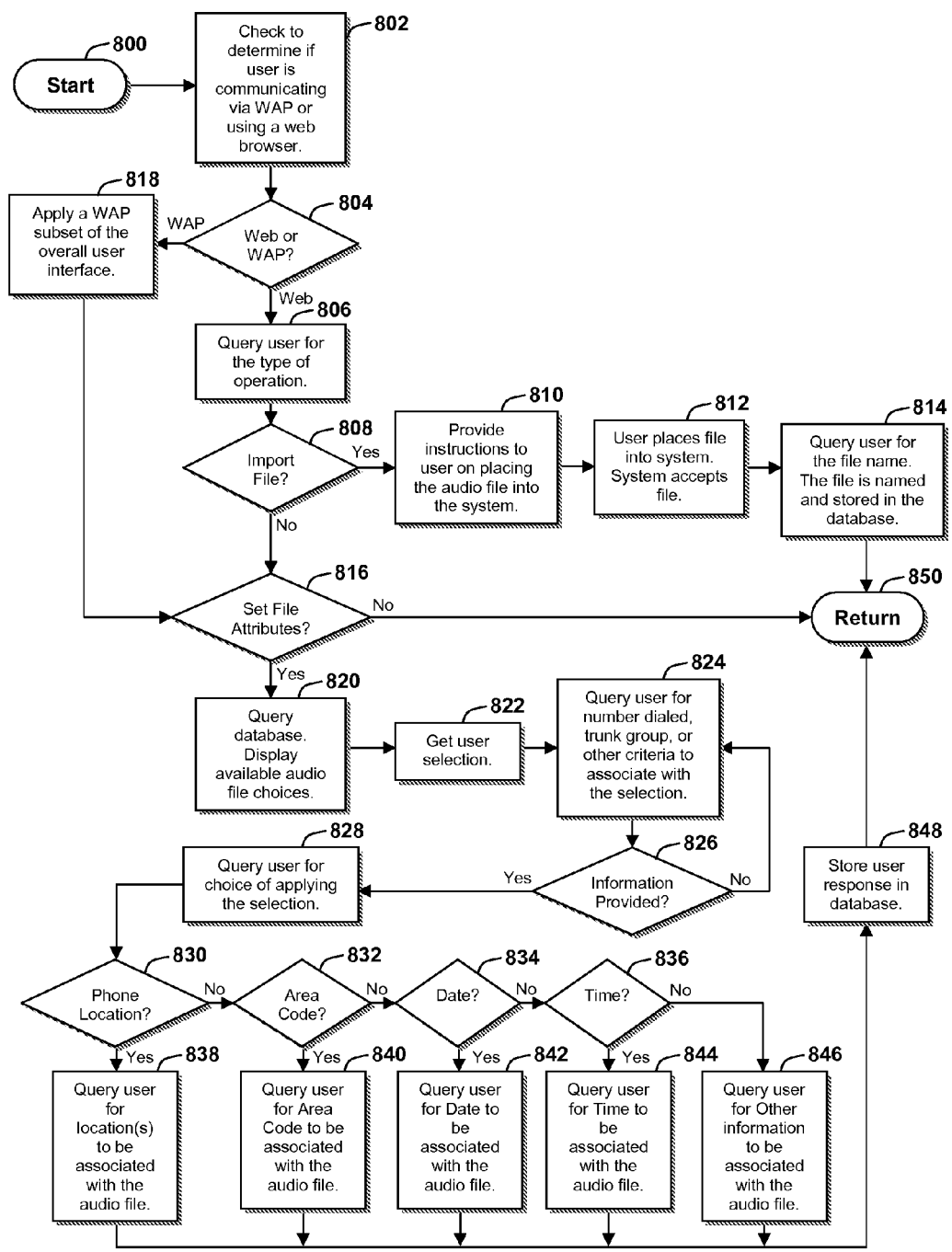
FIG. 8 illustrates a flowchart of an embodiment of a Audio File Control routine for commercial applications carried out according to the principles of the present invention.

Referring now to FIG. 8, illustrated is a flowchart of an embodiment of an Audio File Control routine for commercial applications of the present invention. In a commercial or "corporate" application, for example, a user interface means is needed that enables a user or administrator to store content and apply said content to telephone calls of the corporation based on at least one rule set. In the flowchart, Web and WAP based user interfaces are described. It should be understood that a variety of alternative user interfaces are possible for which the application of principles and capabilities of the present invention would be beneficial. Such an alternative user interface, for example, could be an IVR interface, instant messaging (IM) interface, SMS interface, an MMS interface, or the like. It should also be understood that a user interface for individual consumers or subscribers for configuring the application of content to personal telephone calls is a capability of the present invention as well as user interface capabilities for corporations.

The routine begins in step 800 and proceeds to step 802 where a query is made to determine whether or not the user is accessing the system via a Web based user interface or a WAP based user interface. In a Web based user interface, information is generally presented differently to the user than through a WAP based user interface. For example, Web pages are typically displayed on large, high resolution computer screens. The amount of data required to properly display on a computer screen would require a comparatively long time to transfer at a common data rate for WAP of around 42 kbps over a GPRS network for example. Even at higher data rates used in wireless networks, such as EV-DO or UMTS networks, the much larger data required to process Web based user interface screens can make the user interface slow and cumbersome to use. WAP based user interfaces are generally made up mostly of text and have very small graphic objects displayed, whenever these are used. By transferring a smaller amount of data for operation of the user interface in WAP, the evident speed of usability can be comparable to a Web based interface operating over a high speed broadband network.

In step 804, a test is performed to determine whether the user is applying a Web or WAP based user interface. If the user is applying a WAP based user interface, the routine proceeds to step 818. Otherwise, the routine proceeds to step 806 where a query is performed to determine the type of operation that the user is requesting. In step 808, a test is performed to determine if a content file is to be placed into the system of the present invention such as through the use of a mechanism to import files. If at least one file is to be placed into the system of the present invention, then the routine proceeds to step 810 where instructions on placing content files, such as audio files, into the system are provided to the user via the user interface. In step 812, the user places at least one content file into the system. In step 814, the user is queried via the user interface as to the name or names of the at least one file placed into the system and the information is stored in a database. Following step 814, the routine ends at step 850 by returning and directing operation to other routines, applications, or processes.

Following step 818 where a WAP version of the user interface is applied or following a negative result of the test of step 808, the routine proceeds to step 816 where a test is performed to determine whether or not rules, also referred to as file attributes, for presentation of the content file or files on telephone calls will be designated or set. If no attributes or rules are to be set, the routine ends at step 850 by returning and directing operation to other routines, applications, or processes.

Following a positive result of the test in step 816, the routine proceeds to step 820 where a database is queried and available choices of content files to apply, such as various audio files. In step 822, the user selection that has been input by the user is obtained. In step 824, the user is queried to supply an identifier that can be applied by the system of the present invention to enable calls requiring the application of specialized ringback content on corporate trunk groups, or applied to other types of communications lines based on other criteria, to be properly processed. In step 826, a test is performed to verify that the user has given information. If not, the routine moves back to step 824. Otherwise, the routine proceeds to step 828 where the user is queried as to how to apply the selection made in step 822.

In step 830, a test is performed to determine whether or not a content file is to be applied to a telephone call based on the physical or geographic location of a telephone, such as the mobile telephone of a calling party, a Internet protocol based telephone that has been moved to a new network location yet maintains a set or fixed Internet protocol address, or a wireline telephone of which the physical location is available in an accessible database, for example. If the application of content is to be associated with a telephone location, then the routine proceeds to step 838 where the user is queried for location information. If the result of the test in step 830 is negative, then the routine proceeds to step 832.

In step 832, a test is performed to determine whether or not a content file is to be applied to a telephone call based on the area code of a telephone. If the application of content is to be associated with a area code, then the routine proceeds to step 840 where the user is queried for area code information. If the result of the test in step 832 is negative, then the routine proceeds to step 834.

In step 834, a test is performed to determine whether or not a content file is to be applied to a telephone call based on a date. If the application of content is to be associated with at least one date, then the routine proceeds to step 842 where the user is queried for date information. If the result of the test in step 834 is negative, then the routine proceeds to step 836.

In step 836, a test is performed to determine whether or not a content file is to be applied to a telephone call based on the time of day. If the application of content is to be associated with at least one time of day setting, then the routine proceeds to step 844 where the user is queried for time of day information. If the result of the test in step 836 is negative, then the routine proceeds to step 846.

In step 846, the user is queried for other information as may be applied, for example, caller identification information, specific telephone number information, IP address, or any other identifier. In step 848, the response from the user from any of steps 838, 840, 842, 844, or 846 is stored in a database for use in determining how content is to be applied to calls, keeping statistics on how content is applied, and other functions. The routine ends at step 850 by returning and directing operation to other routines, applications, or processes.

Figure 9:
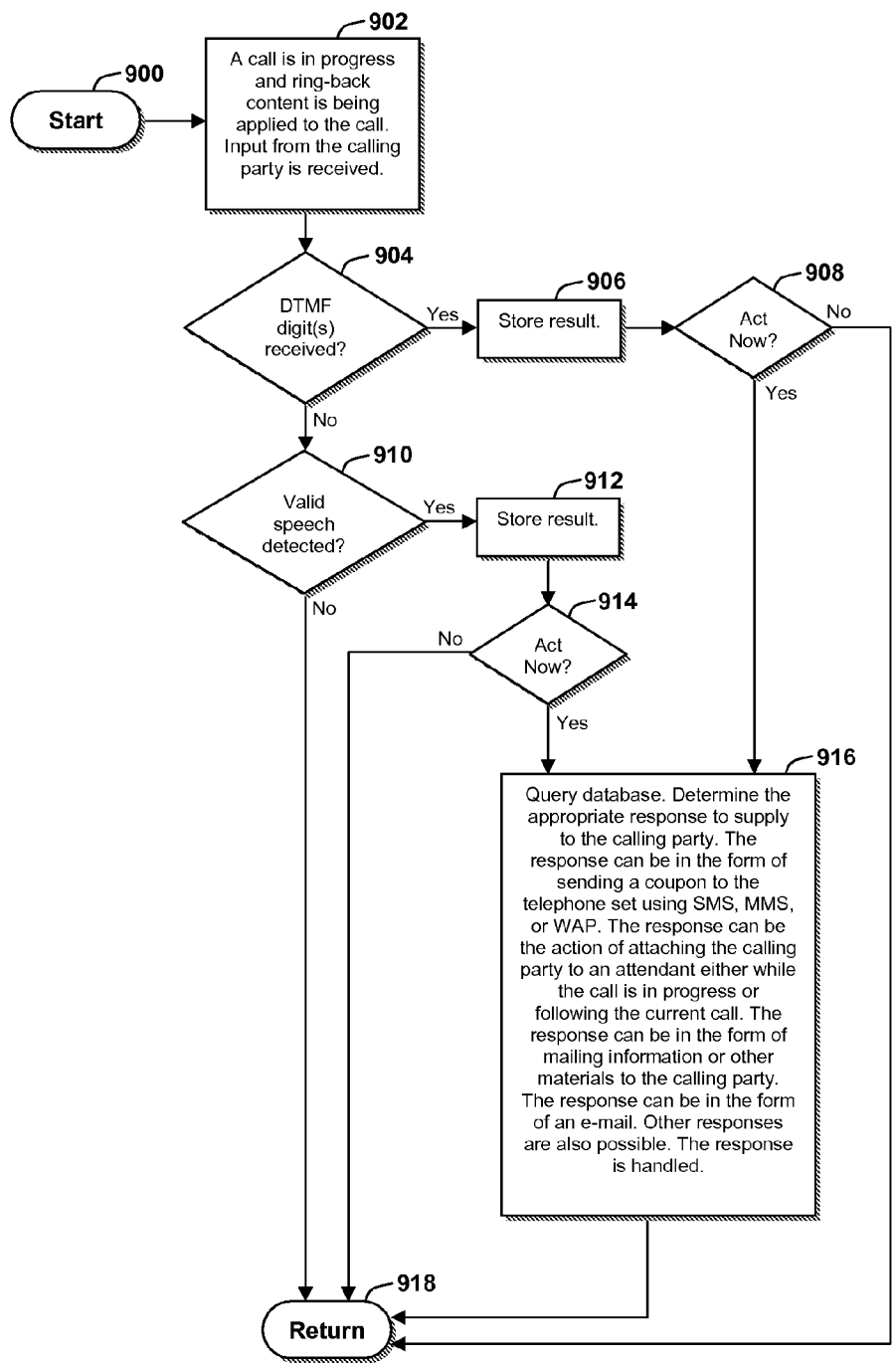
FIG. 9 illustrates a flowchart of an embodiment of a Calling Party Input routine carried out according to the principles of the present invention.

Referring now to FIG. 9, illustrated is a flowchart of an embodiment of a Calling Party Input routine of the present invention. Such a routine for input by the calling party may be implemented whenever input from a calling party is needed in the ringback application. A routine for obtaining input information from at least one calling party during a ringback period of a call in progress is particularly useful for enabling responses to the user input, presentation of advertising information, enabling collection of statistical information from calling parties such as marketing information, sales statistical information, enabling collection of statistical information on calls, and the like.

The routine begins at step 900 and progresses to step 902 where a call is in progress and ringback content such as audio is being applied to the call. Input from the calling party is received. In step 904, a test is made to determine if the input from the calling party was utilizing DTMF digits such as generated from the dialing pad of certain telephones. If input is in the form of DTMF digits, then the routine progresses to step 906 where the information is stored for use immediately and/or for use in another routine, application, or the like. In step 908 a test is made to determine if the information that has been input is to be acted upon immediately. If the result of the test in step 908 is negative, the routine ends at step 918 by returning and directing operation to other routines, applications, or processes. If the result of the test in step 908 is positive, then the routine progresses to step 916.

Referring again to step 904, if the result of the test in step 904 is negative and DTMF digits were not received, then the routine proceeds to step 910 where a test for valid speech input is performed. If input is in the form of a valid speech input, such as a word or phrase that is expected by an application, then the routine proceeds to step 912 where the information is stored for use immediately or by another routine, application, or the like. In step 914, a test is made to determine if the information that has been input is to be acted upon immediately. If the result of the test in step 914 is negative, the routine ends at step 918 by returning and directing operation to other routines, applications, or processes. If the result of the test in step 914 is positive, then the routine progresses to step 916.

In step 916, an immediate response to the input from the calling party is given. The response may be in a form inclusive of, but not limited to sending a coupon to a telephone capable of receiving and displaying electronic data such as via SMS or MMS messaging or via a WAP interface, attaching the call to an attendant or operator, sending a message or information via e-mail, mailing a message or information via a postal service or delivery service, or the like. The response is handled. The routine ends at step 918 by returning and directing operation to other routines, applications, or processes.

Figure 10:
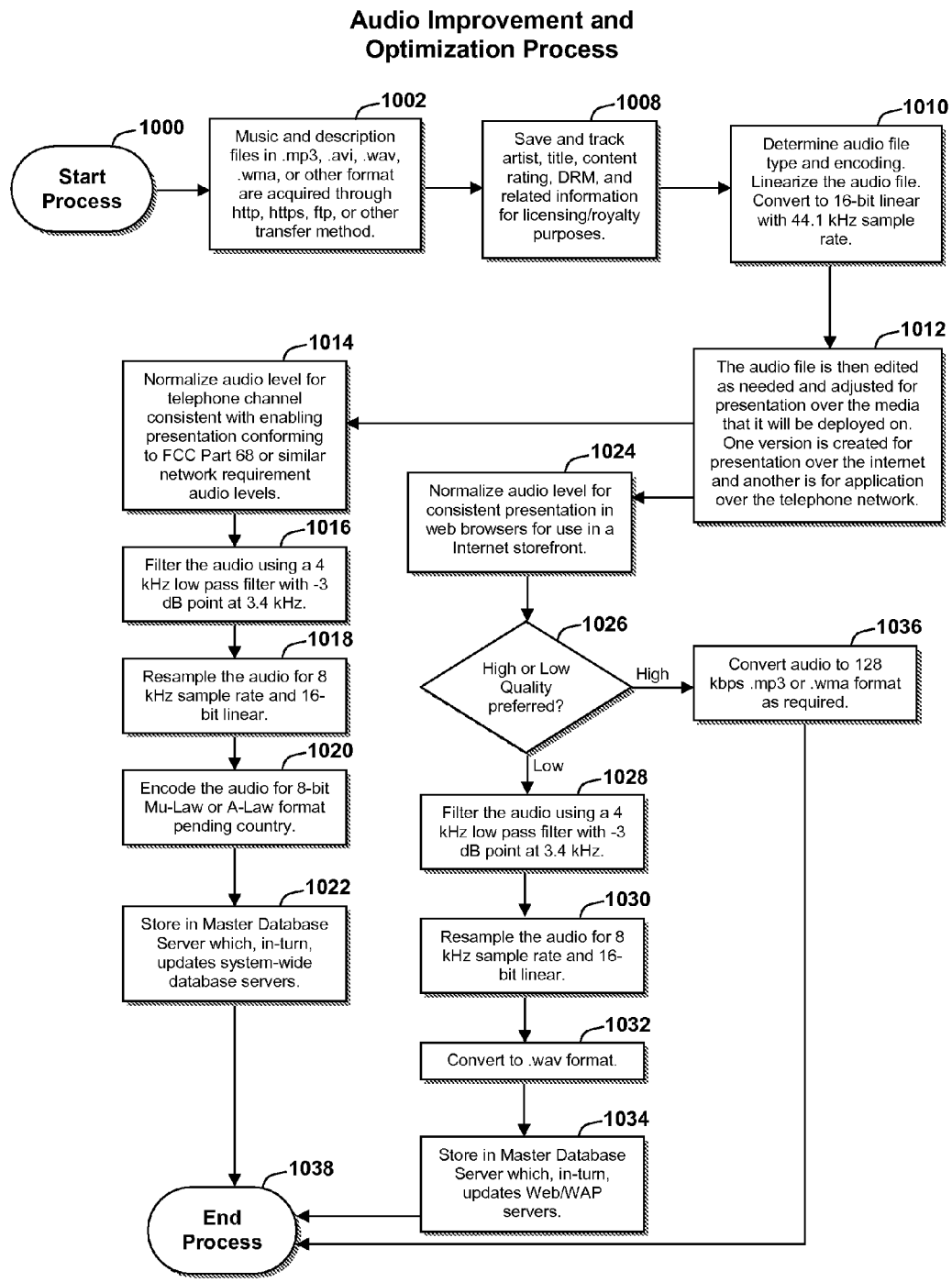
FIG. 10 illustrates a flowchart of an embodiment of an Audio Improvement and Optimization process carried out according to the principles of the present invention.

Referring again to step 910, if the result of the test is negative, then the routine ends at step 918 by returning and directing operation to other routines, applications, or processes Referring now to FIG. 10, illustrated is a flowchart of an embodiment of an Audio Improvement and Optimization process of the present invention. The present invention implements an audio improvement and optimization process in order to ensure high quality presentation of audio such as music, sounds, voice messages, tones, and the like over telecommunications networks such as public switched telephone networks that are conventionally band limited with a pass band between 200 Hz and 3.4 kHz. An audio improvement and optimization routine can also be used to enhance audio quality over wireless networks, VoIP networks, VON networks, and other networks that are typically band limited, encrypted, and/or compressed. Further, such a routine is used to enhance audio presented over audio paths and networks that are not band limited in the audio range. For example, in band limited networks and/or those having a nonlinear pass band, audio can be enhanced by increasing or decreasing the amplitude across portions of audio in various frequency spectrums for the purpose of clarifying the intelligibility of voice or for making music sound more pleasing. In networks that use compression and decompression technologies, proper audio and band limiting is very important in order to reduce distortion in the reproduced audio. The audio improvement and optimization process ensures a very high quality of audio in wireline networks, wireless networks, and/or over Internet connections. Being able to implement a process to enhance audio and place it into a database for use by the present invention for both telephone network requirements and storefront presentation such as over the Internet is an important aspect, because it significantly reduces the amount of time and effort required in placing audio into the database and is especially significant when considering that tens of thousands and possibly millions of pieces of audio content can be placed into the database of the present invention. Another important aspect of the present invention when considering the audio presentation in the storefront is that since the audio is enhanced it can be set to a common level such as would be useful in ensuring that when a user is listening to a plurality of selections in a storefront, the selections are all at the same audio level. In other words, the user is not required to continually change the volume on his or her computer system to keep from having the audio too loud when listening to one selection while having to turn up the audio while listening another selection. Normalizing and setting the audio below a certain level for telephone networks is a specific requirement of various global government regulations, such as FCC Part 68 in the United States. The audio improvement and optimization process of the present invention ensures that high quality and good sounding audio are maintained at appropriate levels.

The process begins in step 1000 and progresses to step 1002 where audio content is acquired for use in the present invention. Said audio content may be music, messages, sounds, sound effects, or any other audio and may be transferred in data files using file types such as .mp3, avi, .wav, .wma, linear format, or the like. The file or files are transfer is preferably performed using a technology such as http, https, ftp, or other type of technology. Additionally, information data associated with the audio are transferred. In step 1008, associated audio data and/or files as well as audio content files are stored. Said associated data and/or files may include, but are not limited to, track, artist, title, ISRC code, digital rights management (DRM), rating such as is used in audience age appropriateness ratings, royalty information, pricing information, cost information, and the like. In step 1010, the audio file type and encoding are determined and the audio content is converted to a linear data format using 16-bit linear encoding at a 44.1 kHz sample rate. The 16-bit linear encoding with 44.1 kHz sample rate is implemented in order to ensure a very high audio quality with a reasonably small memory storage space requirement; however, other formats using alternative sample rates may also be used.

In step 1012, the audio file is edited as needed and adjusted for presentation over the network or media type that it will be deployed over. For example, one version is created for presentation over the Internet and another version is created for application over the telephone network. Depending on the version being created, the routine will progress to step 1014 for telephone network presentation and/or to step 1024 for Internet storefront presentation.

In step 1014, the audio level is normalized and set at a proper amplitude for telephone channel presentation over telephone networks. To enable proper conversion of the audio for presentation over telephone networks, the audio is band limited and is filtered using a 4 kHz low pass filter having a −3 dB point at 3.4 kHz in step 1016. In step 1018, the data of the audio file is resampled at a 8 kHz sample rate with a 16-bit linear format. In step 1020, to continue conversion of the file for use in telephone networks, the audio data is then encoded to a format such as Mu-Law or A-law depending upon the country in which the file is to be presented over a telephone network. In step 1022, the audio file and its associated information data or file(s) are stored in the master database server such as the at least one master database server 108a-108n of FIG. 1. The process ends in step 1038.

Referring to step 1024 of FIG. 10, the audio level is normalized an set for presentation over the Internet such as via a web browser in a storefront. In step 1026, a test is performed to determine if high or low quality audio is desired, typically for reasons of saving memory storage space since lower quality audio can generally be stored in less memory than high quality audio. If high quality audio is desired in step 1026, then the process proceeds to step 1036 where the audio is converted to a 128 kbps streaming rate with a sample rate typically between 22 kHz and 44.1 kHz in a format such as .mp3 or .wma, as required. The process then ends instep 138.

If the result of the test in step 1026 indicated that low quality audio is desired, then the process proceeds to step 1028. In step 1028, the audio is filtered for a lower quality audio conversion such as by implementing a 4 kHz low pass filter with a −3 dB point at 3.4 kHz. In step 1030, the audio is resampled for an 8 kHz sample rate and 16-bit linear format prior to conversion in step 1032 to a .wav format and preferably implementing Mu-Law 8-bit encoding. In step 1034, the audio file is stored in the master database server such as the at least one master database server 108a-108n of FIG. 1 and is made available for Web based and WAP based presentation. The process ends in step 1038.

The invention, therefore, provides a telephone communications system capable of applying audio or other content in place of or in conjunction with a standardized ringback signal or signals on single telephone lines associated with a called party and/or having ringback audio or other content associated with at least one trunk group and respective telephone calls thereof directed to any of a plurality of telephone sets of the called party. Additionally, the invention provides improvements in presenting ringback audio.

The invention also provides a ringback system with the capability of operating in conjunction with more than one telephone network carrier at a time. The ringback system thus has the capability of at least one configurable Internet storefront, at least one provisioning interface, at least one billing interface, and at least one switching system interconnection. While the ringback system of the invention is capable of operating in conjunction with a single carrier, it can further be configured to operate in conjunction with more than one carrier at a time.

Additionally, the invention provides a modular system that can be configured for economical deployment in networks ranging from small to very large. The modules of the ringback system can be configured for a centralized deployment, regional deployments, distributed component deployments, and combinations thereof.

Furthermore, the invention provides the capability for configuring a complete end-to-end system solution for specialized ringback content generation, presentation, replacement, and/or enhancement inclusive of, but not limited to, switching system integration, storefront, billing system integration, provisioning, monitoring, alerting, database, signaling, routing, system control, redundancy, and the like.

In the discussion above, specific systems, subsystems, connections, functions, software, algorithms, encoding, decoding, hardware, etc., were described and discussed. It should be noted that these specific entities are only representative in nature for the purpose of illustration during the discussion. Those skilled in the art will readily understand that various changes may be made to these entities, either in whole or in part, to accommodate network or system configurations supported by the described system while remaining within the broadest scope and intent of the present invention.

It should also be understood, that the embodiments of the illustrated and described with respect to the preceding FIGUREs are submitted for illustrative purposes only and other configurations compatible with the principles of the present invention may be employed as an application dictates. Also, it should be understood that the systems associated with the present invention may be embodied in software, dedicated or hardwired discrete or integrated circuitry, or combinations thereof.

Although the present invention has been described in detail, those skilled in the art should understand that they can make various changes, substitutions and alterations herein without departing from the spirit and scope of the invention in its broadest form.

What is claimed is:

1. A telephone communications system, comprising:
   a master subsystem configured to store ringback information including content and application rules for said ringback information; and
   a trunk interface subsystem coupled to said master subsystem and configured to perform call processing and apply at least a portion of said ringback information to at least one call-in-progress over any one of a group of telecommunications lines according to said application rules.

2. The telephone communications system as recited in claim 1 wherein said master subsystem and said trunk interface subsystem are components of an intelligent peripheral system associated with said telephone communications system.

3. The telephone communications system as recited in claim 1 wherein said trunk interface subsystem operates in a wireless network.

4. The telephone communications system as recited in claim 1 wherein said master subsystem is configured to operate with multiple trunk interface subsystems.

5. The telephone communications system as recited in claim 4 wherein each of said multiple trunk interface subsystems is associated with a different carrier network.

6. The telephone communications system as recited in claim 4 wherein each of said multiple trunk interface subsystems is associated with a different vendor with each vendor having a unique subscriber interface.

7. The telephone communications system as recited in claim 1 wherein said group of telecommunications lines is associated with a number or address selected from the group consisting of:
   an 800 number,
   a 900 number,
   a number representing a hunt group,
   a toll trunk group connection number,
   a DID number,
   a VoIP number, and
   IP multimedia subsystem (IMS) port.

8. The telephone communications system as recited in claim 1 wherein said ringback information further includes a ringback tone and said content is applied to said at least one call-in-progress instead of a ringback tone.

9. The telephone communications system as recited in claim 1 wherein said content is an advertisement.

10. The telephone communications system as recited in claim 9 wherein said advertisement is based on a location of calling party of said call-in-progress.

11. The telephone communications system as recited in claim 1 wherein said content is a message selected from the group consisting of:
    an SMS message,
    a MMS message,
    a multimedia message,
    a video message,
    an audio message,
    a text message, and
    an Instant Messages (IM).

12. The telephone communications system as recited in claim 1 wherein said content is viewable to a calling party of said call-in-progress and is selected from the group consisting of:
    a video selection,
    a video clip,
    a video stream, and
    an animation.

13. The telephone communications system as recited in claim 1 wherein said group of telecommunications lines is associated with a business and said trunk interface subsystem applies said content to said call-in-progress, said content associated with said business and selected from the group consisting of:
    an information message,
    a business jingle,
    audio recognizably associated with said business, and
    advertisements.

14. The telephone communications system as recited in claim 1 wherein said trunk interface subsystem applies said content after a voice path is completed to a calling party of said call-in-progress.

15. The telephone communications system as recited in claim 1 wherein said trunk interface subsystem applied said content to said call-in-progress and is configured to receive input based on said content from a calling party of said call-in-progress.

16. The telephone communications system as recited in claim 1 wherein said trunk interface subsystem applies said content to said call-in-progress, said content including audio that is processed based on a media employed with said call-in-progress.

17. The telephone communications system as recited in claim 1 wherein said master subsystem and said trunk interface subsystem are modular subsystems that are geographically distributed.

18. A method of delivering content to a calling party, comprising:
    receiving an incoming telephone call on a trunk line from a calling party;
    retrieving application rules associated with said trunk line;
    applying content, based on said application rules, to a calling path established with said calling party.

19. The method as recited in claim 18 wherein said trunk line is associated with a business and said content is an advertisement for said business.

20. The method as recited in claim 18 wherein said content is applied while said call is still in-progress.

21. A method of distributing information to a calling party, comprising:
    delivering ringback content to a calling party while a call is in-progress;
    receiving input from said calling party based on said ringback content; and
    distributing information to said calling party based on said input, wherein said information is a coupon and said coupon is distributed to said calling party using a method selected from the group consisting of:
    SMS,
    MMS,
    WAP,
    an Instant Messages (IM),
    e-mail, and
    postal mail.

22. The method as recited in claim 21 wherein said input is at least one DTMF signal.

23. The method as recited in claim 21 wherein said information is distributed while said call is still in-progress.

24. The method as recited in claim 21 wherein said input is received while said call is still in-progress.

* * * * *